US012639018B2

(12) United States Patent
Yamada

(10) Patent No.: US 12,639,018 B2
(45) Date of Patent: May 26, 2026

(54) SYSTEM INCLUDING OPERATION DEVICE AND INFORMATION STORING APPARATUS, METHOD PERFORMED BY THE SYSTEM, AND THE INFORMATION STORING APPARATUS

(71) Applicant: Ricoh Company, Ltd., Tokyo (JP)

(72) Inventor: Kazuhiro Yamada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/411,582

(22) Filed: Jan. 12, 2024

(65) Prior Publication Data

US 2024/0160394 A1     May 16, 2024

Related U.S. Application Data

(63) Continuation of application No. 16/670,005, filed on Oct. 31, 2019, now Pat. No. 11,907,597, which is a
(Continued)

(30) Foreign Application Priority Data

Jul. 10, 2012     (JP) ................................ 2012-154914
Jul. 3, 2013      (JP) ................................ 2013-139587

(51) Int. Cl.
*G06F 3/12*          (2006.01)
*H04N 1/00*          (2006.01)

(52) U.S. Cl.
CPC .......... *G06F 3/1245* (2013.01); *G06F 3/1204* (2013.01); *G06F 3/1206* (2013.01);
(Continued)

(58) Field of Classification Search
None
See application file for complete search history.

(56) References Cited

U.S. PATENT DOCUMENTS 6,425,001 B2     7/2002  Lo et al.
6,449,637 B1     9/2002  Toga
(Continued)

FOREIGN PATENT DOCUMENTS

CN          102122282         7/2011
EP          2395422          12/2011
(Continued)

OTHER PUBLICATIONS

International Search Report Issued Oct. 15, 2013 in PCT/JP2013/069073 filed on Jul. 5, 2013.
(Continued)

*Primary Examiner* — Beniyam Menberu
(74) *Attorney, Agent, or Firm* — XSENSUS LLP

(57)          ABSTRACT

A system includes an operation device and an information storing apparatus, which are connected via a network. The operation device determines, based on information input from the outside of the operation device in response to an operation performed on the operation device, an electronic device among a plurality of electronic devices connected to the system, for causing the electronic device to input electronic data to the information storing apparatus, and sends, to the information storing apparatus, a first request to cause the determined electronic device to input the electronic data to the information storing apparatus. The information storing apparatus sends, to the determined electronic device, a second request based on the first request sent from the operation device, and stores the electronic data that has been sent from the determined electronic device based on the sent second request.

20 Claims, 37 Drawing Sheets

Related U.S. Application Data continuation of application No. 15/933,968, filed on Mar. 23, 2018, now Pat. No. 10,908,857, which is a continuation of application No. 15/497,573, filed on Apr. 26, 2017, now Pat. No. 9,959,081, which is a continuation of application No. 15/181,553, filed on Jun. 14, 2016, now Pat. No. 9,665,325, which is a continuation of application No. 14/849,708, filed on Sep. 10, 2015, now Pat. No. 9,389,819, which is a continuation of application No. 14/239,587, filed as application No. PCT/JP2013/069073 on Jul. 5, 2013, now Pat. No. 9,164,713.

(52) U.S. Cl.
CPC .......... *G06F 3/1232* (2013.01); *G06F 3/1247* (2013.01); *G06F 3/1268* (2013.01); *G06F 3/1286* (2013.01); *G06F 3/1292* (2013.01); *H04N 1/00251* (2013.01); *H04N 1/00334* (2013.01); *H04N 1/00344* (2013.01); *H04N 2201/0039* (2013.01); *H04N 2201/0075* (2013.01); *H04N 2201/0094* (2013.01)

(56) References Cited

U.S. PATENT DOCUMENTS

| | | | |
|---|---|---|---|
| 7,765,271 B1* | 7/2010 | Bahr .................. H04N 1/00413 |
| | | | 358/1.15 |
| 8,259,326 B2 | 9/2012 | Sensu et al. |
| 8,610,935 B1 | 12/2013 | McKinley et al. |
| 9,164,713 B2 | 10/2015 | Yamada |
| 9,389,819 B2 | 7/2016 | Yamada |
| 9,665,325 B2 | 5/2017 | Yamada |
| 9,959,081 B2 | 5/2018 | Yamada |
| 10,079,945 B2 | 9/2018 | Kono |
| 2002/0004802 A1 | 1/2002 | Shima |
| 2002/0033967 A1 | 3/2002 | Liu |
| 2004/0034862 A1* | 2/2004 | Kadota .................. G06F 9/4411 |
| | | | 719/321 |
| 2004/0190049 A1 | 9/2004 | Itoh |
| 2005/0081137 A1 | 4/2005 | Ferlitsch |
| 2005/0120096 A1 | 6/2005 | Rekimoto et al. |
| 2005/0131907 A1 | 6/2005 | Matsuzawa et al. |
| 2005/0174603 A1 | 8/2005 | Iinuma et al. |
| 2005/0174606 A1 | 8/2005 | Matsueda et al. |
| 2005/0190397 A1 | 9/2005 | Ferlitsch |
| 2005/0198072 A1 | 9/2005 | Iinuma et al. |
| 2005/0213147 A1 | 9/2005 | Minatogawa |
| 2006/0017941 A1 | 1/2006 | Momozono et al. |
| 2006/0066899 A1 | 3/2006 | Yoshida |
| 2006/0085516 A1 | 4/2006 | Farr et al. |
| 2006/0106663 A1 | 5/2006 | Takasugi et al. |
| 2006/0152592 A1 | 7/2006 | Chishima et al. |
| 2006/0221407 A1 | 10/2006 | Uchida et al. |
| 2006/0271675 A1* | 11/2006 | Wakazono ......... H04N 1/00222 |
| | | | 709/224 |
| 2006/0277229 A1 | 12/2006 | Yoshida et al. |
| 2007/0019232 A1 | 1/2007 | Kano |
| 2007/0047006 A1 | 3/2007 | Sakai |
| 2008/0039063 A1 | 2/2008 | Ichieda |
| 2008/0049252 A1 | 2/2008 | Sakuda |
| 2008/0055634 A1 | 3/2008 | Miyahara |
| 2008/0106597 A1 | 5/2008 | Amini et al. |
| 2008/0192287 A1 | 8/2008 | Iwai |
| 2008/0235303 A1 | 9/2008 | Sensu et al. |
| 2008/0263134 A1 | 10/2008 | Machida |
| 2009/0019392 A1* | 1/2009 | Nomura .................. G06F 16/54 |
| | | | 715/810 |
| 2009/0033972 A1* | 2/2009 | Kato .................... G06F 3/1236 |
| | | | 358/1.15 |
| 2009/0207445 A1* | 8/2009 | Kimura .............. G06F 3/1236 |
| | | | 358/1.15 |
| 2009/0295925 A1 | 12/2009 | Miyamaki |

| | | | |
|---|---|---|---|
| 2010/0005136 A1 | 1/2010 | Ferlitsch et al. |
| 2010/0083042 A1 | 4/2010 | Yamada |
| 2010/0123927 A1 | 5/2010 | Hirose |
| 2010/0214629 A1* | 8/2010 | Patterson ........... H04N 1/00244 |
| | | | 455/41.2 |
| 2011/0019242 A1 | 1/2011 | Tajima et al. |
| 2011/0096354 A1 | 4/2011 | Liu |
| 2011/0170122 A1 | 7/2011 | Kihara et al. |
| 2011/0242558 A1 | 10/2011 | Usui |
| 2011/0279859 A1 | 11/2011 | Hashimoto |
| 2011/0292445 A1* | 12/2011 | Kato ..................... G06F 3/1292 |
| | | | 358/1.15 |
| 2011/0317211 A1* | 12/2011 | Yamada ............. H04N 1/00129 |
| | | | 358/1.15 |
| 2012/0008161 A1* | 1/2012 | Rouhana ................. H04W 4/80 |
| | | | 358/1.15 |
| 2012/0019858 A1 | 1/2012 | Sato |
| 2012/0079081 A1 | 3/2012 | Parks et al. |
| 2012/0110065 A1 | 5/2012 | Oshima et al. |
| 2012/0173347 A1* | 7/2012 | De Almeida Neves ..................... |
| | | | G06K 7/10861 |
| | | | 705/16 |
| 2012/0273565 A1 | 11/2012 | Lin |
| 2012/0311189 A1 | 12/2012 | Yamada |
| 2013/0013662 A1 | 1/2013 | Masuda |
| 2013/0148162 A1 | 6/2013 | Park et al. |
| 2013/0194623 A1 | 8/2013 | Tecu et al. |
| 2013/0246923 A1 | 9/2013 | Iwai et al. |
| 2013/0250326 A1 | 9/2013 | Kono |
| 2013/0262600 A1 | 10/2013 | Ishida |
| 2013/0278968 A1 | 10/2013 | Kusakabe |
| 2014/0016153 A1 | 1/2014 | Miyata |
| 2014/0016161 A1 | 1/2014 | Yamada |
| 2014/0016816 A1* | 1/2014 | Yamada ............... G06F 3/1247 |
| | | | 709/217 |
| 2014/0019859 A1* | 1/2014 | Hashimoto ........... G06F 40/174 |
| | | | 715/273 |
| 2014/0029048 A1 | 1/2014 | Arakawa et al. |
| 2020/0081668 A1 | 3/2020 | Yamada |

FOREIGN PATENT DOCUMENTS

| | | | | |
|---|---|---|---|---|
| JP | 2000-137592 | | 5/2000 | |
| JP | 2001-036661 | | 2/2001 | |
| JP | 2002-132477 A | | 5/2002 | |
| JP | 2002-342050 | | 11/2002 | |
| JP | 2003-114773 | | 4/2003 | |
| JP | 2004-030280 | | 1/2004 | |
| JP | 2004-056366 | | 2/2004 | |
| JP | 2004-213445 | | 7/2004 | |
| JP | 2004236031 | * | 8/2004 | ............... H04N 1/00 |
| JP | 2004246620 | * | 9/2004 | ............... G06F 3/12 |
| JP | 2005-064551 | | 3/2005 | |
| JP | 2005-242875 | | 9/2005 | |
| JP | 2006-127478 | | 5/2006 | |
| JP | 2006-186645 | | 7/2006 | |
| JP | 2006-287389 | | 10/2006 | |
| JP | 2007-034443 | | 2/2007 | |
| JP | 2007-312179 | | 11/2007 | |
| JP | 2007-336252 | | 12/2007 | |
| JP | 2008-071126 | | 3/2008 | |
| JP | 2008-072517 | | 3/2008 | |
| JP | 2008-186161 A | | 8/2008 | |
| JP | 2008262281 | * | 10/2008 | ............... G06K 9/68 |
| JP | 2009-267578 | | 11/2009 | |
| JP | 2010-177947 A | | 8/2010 | |
| JP | 2010-226182 | | 10/2010 | |
| JP | 2010-277324 | | 12/2010 | |
| JP | 2011-035833 | | 2/2011 | |
| JP | 2011-054097 | | 3/2011 | |
| JP | 2011081741 | * | 4/2011 | ............... G06F 3/12 |
| JP | 2011-142557 | | 7/2011 | |
| JP | 2012-090077 | | 5/2012 | |
| JP | 2012-094086 | | 5/2012 | |
| JP | 2012098775 | * | 5/2012 | ............. G06Q 50/20 |
| WO | 2003/015451 | | 2/2003 | |
| WO | 2012/166098 | | 12/2012 | |

(56) References Cited

FOREIGN PATENT DOCUMENTS

OTHER PUBLICATIONS

Office Action dated Jun. 24, 2015 in Chinese Application No. 201380002984.0.
Extended European Search Report dated Feb. 9, 2016 in European Application No. 13816224.3.
Office Action dated Sep. 27, 2016 in Japanese Application No. 2015-237308.
Office Action dated Aug. 13, 2018 issued with respect to the corresponding European Patent Application No. 13816224.3.
Japanese Office Action for 2018-201031 mailed on Sep. 24, 2019.
Office Action dated Nov. 25, 2019 issued to related U.S. Appl. No. 15/933,968.
Extended European Search Report for 20160897.3 mailed on Jun. 19, 2020.
Japanese Office Action for 2018-201031 mailed on May 12, 2020.
Office Action dated Apr. 2, 2020 issued to related U.S. Appl. No. 15/933,968.
Japanese Office Action for 2020-071283 mailed on Feb. 2, 2021.
Japanese Office Action for JP2020-071283 mailed on Jul. 6, 2021.
Office Action dated Mar. 30, 2021 issued to related U.S. Appl. No. 16/902,601.
D. Lee et al., "Network Scanning on Multi Function Device", 2009 First International conference on Advances in Multimedia, 2009, pp. 116-120, doi: 10.1109/MMEDIA.2009.28.(Year:2009).
Office Action dated Nov. 2, 2021 issued to related U.S. Appl. No. 16/902,601.
Japanese Office Action for 2020-071283 mailed on Nov. 16, 2021.
Office Action dated Mar. 16, 2022 issued to related U.S. Appl. No. 16/902,601.
Japanese Office Action for 2020-71283 mailed on Jun. 14, 2022.
Office Action dated Nov. 25, 2020 issued to related U.S. Appl. No. 16/670,005.
Final Office Action dated May 26, 2021 issued to related U.S. Appl. No. 16/670,005.
Office Action dated Oct. 1, 2021 issued to related U.S. Appl. No. 16/670,005.
Office Action issued Jan. 6, 2026 in Japanese Patent Application No. 2025-004500, 6 pages.

* cited by examiner

FIG.5

```
{"filelist":[{"name":"20091106.ppt",
       "size":2137088,
       "last_access_time":1323148816453,
       "is_dir":false,
       "last_modified_time":1282784936697,
       "creation_time":1317084202953,
       "convertible_format":["thumbnail","jpeg","pdf","rpcs"],
       "converted_format":["thumbnail"],
       "total_pages":20}, {"name":"Blue hills.jpg",
       "size":28521,
       "last_access_time":1322740650125,
       "is_dir":false,
       "last_modified_time":1091707200000,
       "creation_time":1315479900890,
       "converted_format":,
       "total_pages":1]]

"total_results":20}
```

|    | ATTRIBUTE NAME |                    | RANGE    | DESCRIPTION |
|----|----------------|--------------------|----------|-------------|
| 1  | filelist       | name               | String   | IT FOLDER NAME |
| 2  |                | size               | long     | FILE SIZE (NUMBER OF BYTES) |
| 3  |                | is_dir             | boolean  | FOLDER:true, FILE:false |
| 4  |                | last_access_time   | long     | ACCESS DATE AND TIME |
| 5  |                | last_modified_time | long     | LATEST UPDATED DATE AND TIME |
| 6  |                | creation_time      | long     | CREATION DATE AND TIME |
| 7  |                | convertible_format | String[] | FILE FORMAT(S) TO WHICH FILE CAN BE CONVERTED |
| 8  |                | converted_format   | String[] | FILE FORMAT TO WHICH FILE HAS BEEN CONVERTED |
| 9  |                | total_pages        | int      | TOTAL NUMBER OF PAGES |
| 10 | total_results  |                    | int      | TOTAL NUMBER OF FILES |

1010

TOP    CREATE FOLDER    UPDATE category
2012/06/07 19:06:04    > data
2012/06/07 19:06:04    >

(THUMB
—NAIL)    workflow
2012/06/07 19:06:04    >

3 FILES

FILES    UPLOAD    SETTINGS

| ITEM | SETTING VALUE | DESCRIPTION |
|---|---|---|
| HostAddress | 192.168.0.10 | IP ADDRESS OF MFP |
| Function | Scan,Print | FUNCTION INFORMATION |

FIG.13

{"Source":"Auto","Size":"Auto","Mode":"Text/Photo","Resolution":"300", "Side":"Simplex","Path":"AllUsers/data/"}

FIG.14

| # | COMMAND | PARAMETER | DESCRIPTION |
|---|---------|-----------|-------------|
| 1 | doScan | SMB PATH | PATH OF SMB FOR STORING DATA OBTAINED FROM SCAN |
| 2 | ScanSetting | Mode | DOCUMENT READING MODE |
| | | Resolution | RESOLUTION |
| | | ImageDensity | DENSITY |
| | | ImageADS | BACKGROUND REMOVAL/WHITE BALANCE |
| | | Size | READING SIZE |
| | | Source | PAPER SUPPLY TYPE |
| | | Orientation | ORIENTATION OF DOCUMENT TO SET |
| | | Side | SIMPLEX DOCUMENT OR DUPLEX DOCUMENT |
| | | DuplexType | DIRECTION OF OPENING DUPLEX DOCUMENT |
| | | XferFileType | DATA TYPE OF IMAGE TO TRANSFER |

1050

1060

1062 QR

1061 PRINT SETTINGS

ESTIMATE SHEET.doc

ESTIMATE SHEET

1063

1 of 10

CREATE FOLDER | UPDATE

AllUsers

MINUTE OF MEETING >
2012/06/07 19:06:04 memo >
2012/06/07 19:06:04

(THUMB-NAIL) ESTIMATE SHEET.doc
2012/06/07 19:06:04

(THUMB-NAIL) Scan_20120607.pdf
2012/06/07 19:06:04

4 FILES

FILES | UPLOAD | SETTINGS

FIG.30

| # | PROTOCOL | METHOD | PARAMETER | DESCRIPTION |
|---|----------|--------|-----------|-------------|
| 1 | TCP/IP (SOCKET COMMUNICATION) | send | socket | DESIGNATE PORT NUMBER AND TRANSMISSION DESTINATION |
| | | | data | PRINT DATA |

FIG.31

| # | COMMAND | PARAMETER | DESCRIPTION |
|---|---------|-----------|-------------|
| 1 | doPrint | fileName | FILE NAME OF FILE TO PRINT |
| 2 | PrintSetting | printCopies | NUMBER OF COPIES |
| | | printColorBw | COLOR/MONOCHROME |
| | | printPaperSize | PAPER SIZE |
| | | printDuplex | SIMPLEX/DUPLEX |

FIG.34

| ITEM | SETTING VALUE | DESCRIPTION |
|---|---|---|
| HostAddress | 192.168.0.10 | IP ADDRESS OF PROJECTOR |
| name | PRJ1234 | PROJECTOR NAME |
| Function | Projection | FUNCTION INFORMATION |
| ProjectionType | Protocol:XXXX | TYPE OF PROJECTOR |

FIG.35

| # | PROTOCOL | METHOD | DESCRIPTION | REQUEST URL |
|---|---|---|---|---|
| 1 | HTTP | POST | PROJECT BY PROJECTOR | http://IP ADDRESS/service/projection/ |

SYSTEM INCLUDING OPERATION DEVICE AND INFORMATION STORING APPARATUS, METHOD PERFORMED BY THE SYSTEM, AND THE INFORMATION STORING APPARATUS

CROSS-REFERENCES TO RELATED APPLICATIONS

This application is a continuation application of and claims the benefit of priority under 35 U.S.C. 120 to patent application Ser. No. 16/670,005 filed on Oct. 31, 2019, which is a continuation application of and claims the benefit of priority under 35 U.S.C. 120 to patent application Ser. No. 15/933,968 filed on Mar. 23, 2018, which is a continuation application of and claims the benefit of priority under 35 U.S.C. 120 to patent application Ser. No. 15/497,573 filed on Apr. 26, 2017, which is a continuation application of and claims the benefit of priority under 35 U.S.C. 120 to patent application Ser. No. 15/181,553 filed on Jun. 14, 2016, which is a continuation application of and claims the benefit of priority under 35 U.S.C. 120 to patent application Ser. No. 14/849,708 filed on Sep. 10, 2015, which is a continuation application of and claims the benefit of priority under 35 U.S.C. 120 of patent application Ser. No. 14/239,587 filed on Feb. 19, 2014, which has effectively entered under 35 U.S.C. 371 (c) the national stage from International Application No. PCT/JP2013/069073 filed on Jul. 5, 2013, which claims the benefit of priority of Japanese Patent Application No. 2012-154914 filed on Jul. 10, 2012 and Japanese Patent Application No. 2013-139587 filed on Jul. 3, 2013 with the Japan Patent Office, where the entire contents of all applications are incorporated herein by reference.

TECHNICAL FIELD

The present invention relates to a system including an operation device and an information storing apparatus, a method performed by the system, and the information storing apparatus.

BACKGROUND ART

For example, a host session management server is known, which can easily realize a communication service using a plurality of different apparatuses that operate in cooperation with each other (for example, see Japanese Laid-Open Patent Application No. 2011-35833).

Recently, users use various electronic devices such as a printer, a MultiFunction Peripheral (MFP), a projector and so forth, which output electronic data, and/or various information processing apparatuses such as a portable phone, a smartphone, a tablet terminal and so forth. Concerning such a mode (system) of using these electronic devices and information processing apparatuses, it is expected to improve the utility values thereof as a result of causing these apparatuses to operate in cooperation with each other.

For this purpose, in such a system of using electronic devices and information processing apparatuses, a mechanism has been demanded by which various electronic devices and information processing apparatuses operate in cooperation with each other to provide a service(s).

SUMMARY OF INVENTION

According to one embodiment of the present invention, a system includes an operation device and an information storing apparatus, which are connected via a network. The operation device includes a determining unit configured to determine, based on information input from the outside of the operation device in response to an operation performed on the operation device, an electronic device among a plurality of electronic devices connected to the system, the electronic device to be determined being caused to input electronic data to the information storing apparatus, and a first sending unit configured to send, to the information storing apparatus, a first request to cause the determined electronic device to input the electronic data to the information storing apparatus. The information storing apparatus includes a second sending unit configured to send, to the determined electronic device, a second request to cause the determined electronic device to input the electronic data to the information storing apparatus, based on the first request sent from the first sending unit of the operation device, and a storing unit configured to store the electronic data in the information storing apparatus, the electronic data having been sent from the determined electronic device based on the second request sent by the second sending unit.

Other objects, features and advantages of the present invention will become more apparent from the following detailed description when read in conjunction with the accompanying drawings.

BRIEF DESCRIPTION OF THE DRAWINGS

FIG. 5 is a configuration diagram of one example of a response to a file list obtaining request;

FIG. 12 is a configuration diagram of one example of information to be read from a QR code;

FIG. 13 is a configuration diagram of one example of scan information included in a file;

FIG. 14 is a configuration diagram of one example of commands to be used for a scan start instruction to an MFP from the information storing apparatus;

FIG. 30 illustrates one example of a method of transmitting a print file to the MFP;

FIG. 31 is a configuration diagram of one example of print commands included in the print file;

FIG. 34 is a configuration diagram of one example of information to be read from a QR code;

FIG. 35 illustrates one example of a method of transmitting a projection file to a projector;

DESCRIPTION OF THE EMBODIMENTS

Below, the embodiments of the present invention will be described.

First Embodiment

<System Configuration>

Figure 1:
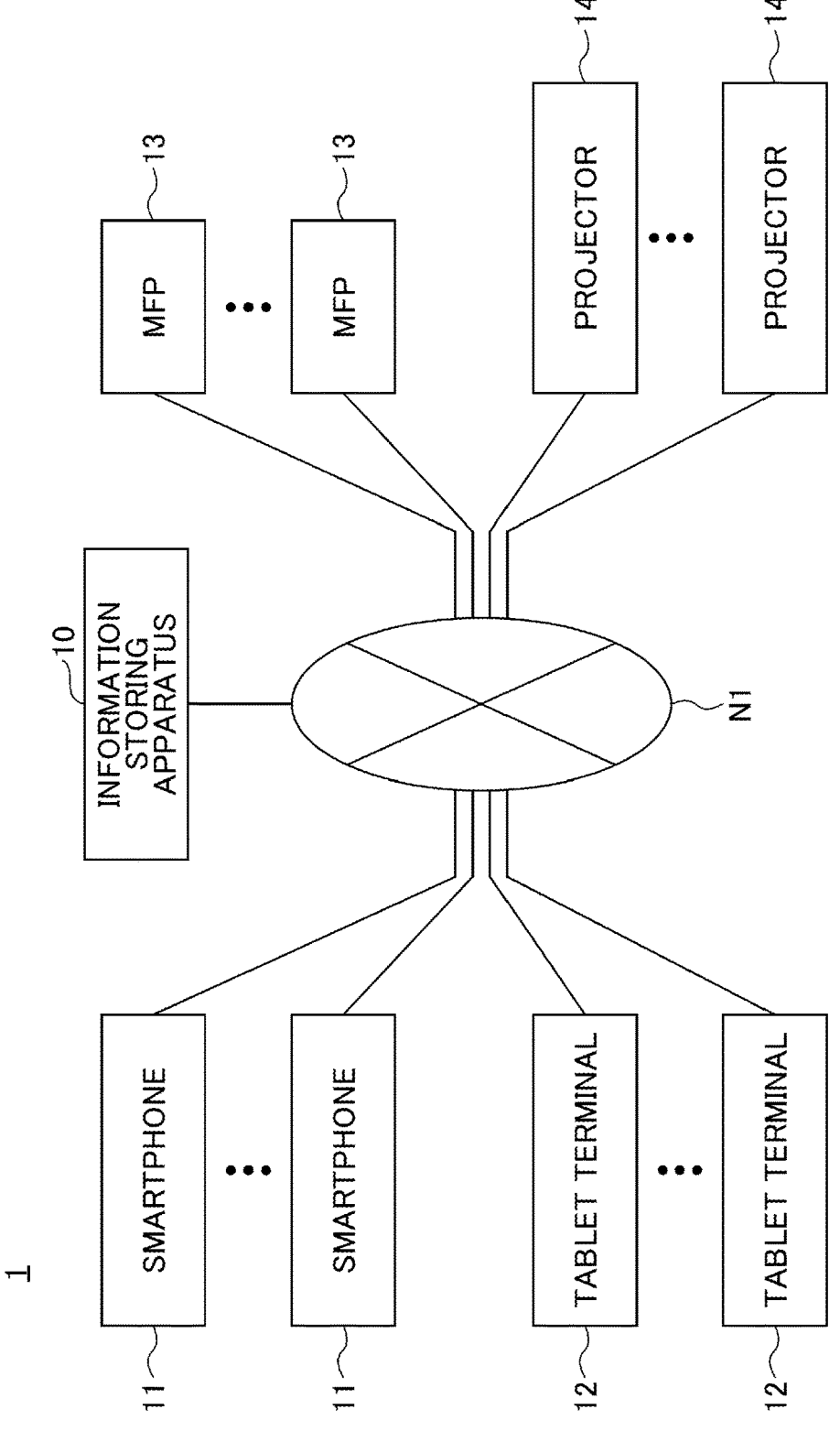
FIG. 1 is a configuration diagram of one example of a service providing system according to a first embodiment.

FIG. 1 is a configuration diagram of one example of the service providing system according to the first embodiment. In the service providing system 1 of FIG. 1, as one example, an information storing apparatus 10, one or more smartphones 11, one or more tablet terminals 12, one or more MFPs 13 and one or more projectors 14 are connected to a network N1 such as a Local Area Network (LAN).

As the network N1, it is possible to use a network of a private environment such as an intranet, for example. The smartphones 11 and the tablet terminals 12 are examples of information processing apparatuses that users carry and operate. Specific examples of the information processing apparatuses may be apparatuses that users can operate, and thus include, not only the above-mentioned smartphones 11 and the tablet terminals 12, but also portable phones, notebook-size Personal Computers (PC), and so forth.

The MFPs 13 and the projectors 14 are examples of electronic devices that provide services such as print, scan, projection and so forth. Specific examples of the electronic devices may be apparatuses that can provide services, and thus include, not only the above-mentioned MFPs 13 and the projectors 14, but also printers, scanners, copiers, image display apparatuses, and so forth.

The MFPs 13 are examples of image forming apparatuses. The MFPs 13 have image taking functions, image forming functions and communication functions, and can be used as printers, facsimile machines, scanners and copiers. The projectors 14 are examples of image projection apparatuses, and have projection functions and communication functions.

The information storing apparatus 10 is one example of a cooperative processing apparatus. The information storing apparatus 10 carries out such sophisticated processes that the MFPs 13 and projectors 14 cannot carry out, and carries out processes as a file server. The information storing apparatus 10 provides services using electronic devices such as the MFPs 13 and/or the projectors 14 in cooperation with information processing apparatuses such as the smartphones 11 and/or the tablet terminals 12. Each of the smartphones 11 and the tablet terminals 12 is one example of an operation device. It is noted that the information storing apparatus 10 may be configured by a plurality of computers in a decentralized manner.

<Hardware Configuration>

Figure 2:
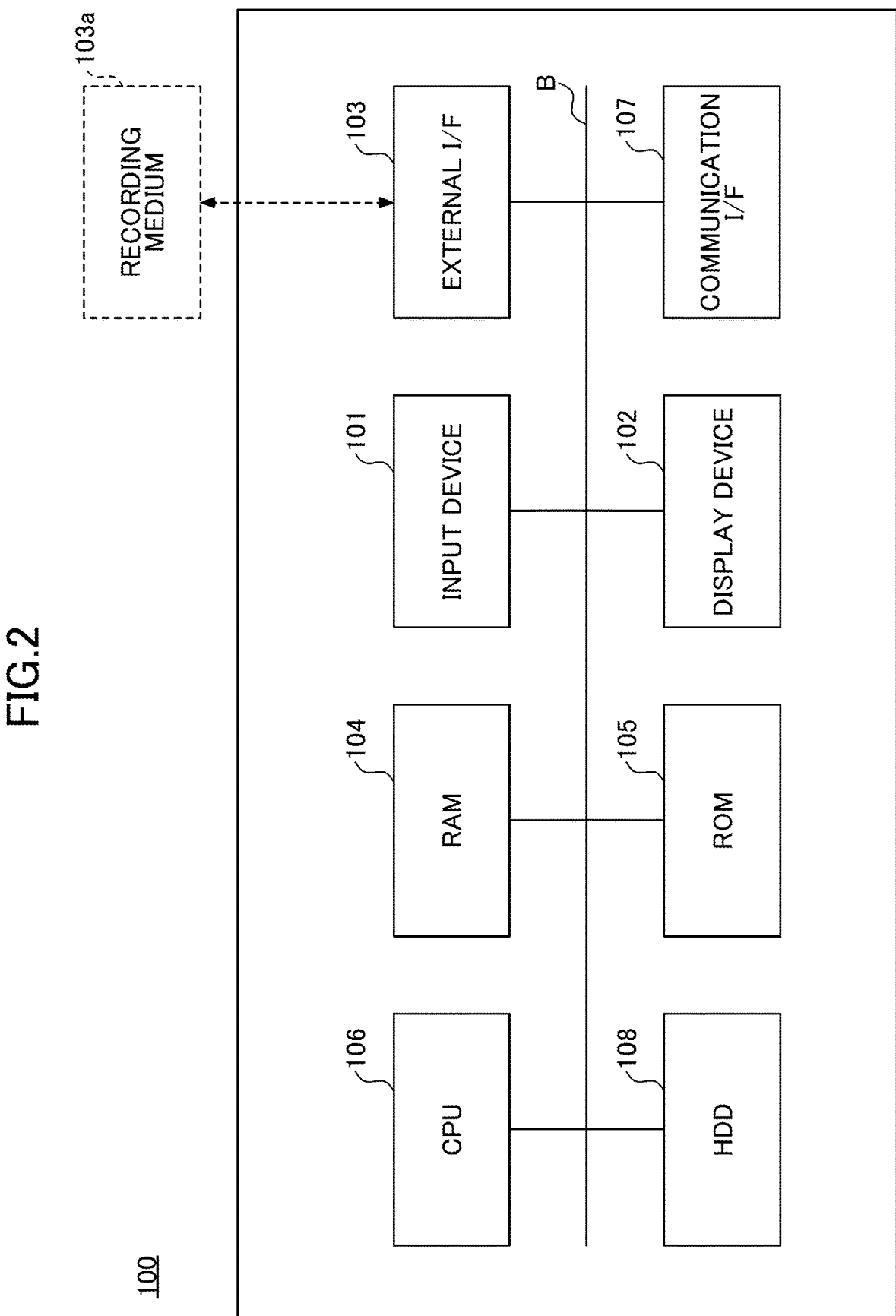
FIG. 2 is a hardware configuration diagram of one example of a computer system according to the first embodiment.

The information storing apparatus 10 is realized, for example, by a computer system having the hardware configuration shown in FIG. 2. Also, information processing apparatuses such as the smartphones 11 and the tablet terminals 12 include the hardware configurations shown in FIG. 2. FIG. 2 is a hardware configuration diagram of one example of the computer system according to the first embodiment.

The computer system 100 of FIG. 2 includes an input device 101, a display device 102, an external I/F 103, a RAM 104, a ROM 105, a CPU 106, a communication I/F 107 and a Hard Disk Drive (HDD) 108, which are connected together via a bus B. The input device 101 includes a keyboard, a mouse and so forth, and is used to input respective operation signals.

The display device 102 includes a display and/or the like, and displays processing results of the computer system 100. The communication I/F 107 is an interface for connecting the computer system 100 to the network N1. Thereby, the computer system 100 can carry out data communication with the other apparatuses via the communication I/F 107.

The HDD 108 is a nonvolatile storage device storing programs and data. The programs stored by the HDD 108 include an Operating System (OS) that is basic software controlling the entirety of the computer system 100, application software providing various functions under the control of the OS, and so forth. The HDD 108 manages the stored programs and data using a predetermined file system and/or DataBase (DB).

The external I/F 103 is an interface between the computer system 100 and external devices. The external devices include a recording medium 103a and so forth. Thereby, the computer system 100 can carry out reading information from and/or writing information to the recording medium 103a via the external I/F 103. It is noted that specific examples of the recording medium 103a include a flexible disk, a CD, a Digital Versatile Disk (DVD), a SD memory card, a Universal Serial Bus memory (USB memory) and so forth.

The ROM 105 is a nonvolatile semiconductor memory (storage device) and thus can store programs and/or data even after the power supply has been turned off. The ROM 105 stores programs and data such as a Basic Input/Output System (BIOS) to be executed when the computer system 100 is started up, OS settings, network settings, and so forth. The RAM 104 is a volatile semiconductor memory (storage device) and temporarily stores programs and/or data.

The CPU 106 includes an arithmetic and logic unit, reads programs and/or data from storage device(s) such as the ROM 105 and/or HDD 108 to the RAM 140, carries out processes, and thus, realizes controls and/or functions of the entirety of the computer system 100.

The computer system 100 according to the first embodiment can realize various processes described later using this hardware configuration.

The CPU 106 in the smartphone 11 or the tablet terminal 12 is one example of a determining unit.

The CPU 106 in the information storing apparatus 10 is one example of a storing unit.

The HDD 108 in the information storing apparatus 10 is one example of a memory.

The CPU 106 and the communication I/F 107 in the smartphone 11 or the tablet terminal 12 are one example of a first sending unit.

The CPU 106 and the communication I/F 107 in the information storing apparatus 10 are one example of a second sending unit.

The CPU 106 and the communication I/F 107 in the information storing apparatus 10 are one example of a reception unit.

The CPU 106 and the communication I/F 107 in the information storing apparatus 10 are one example of a sending unit.

<Software Configuration>

Figure 3:
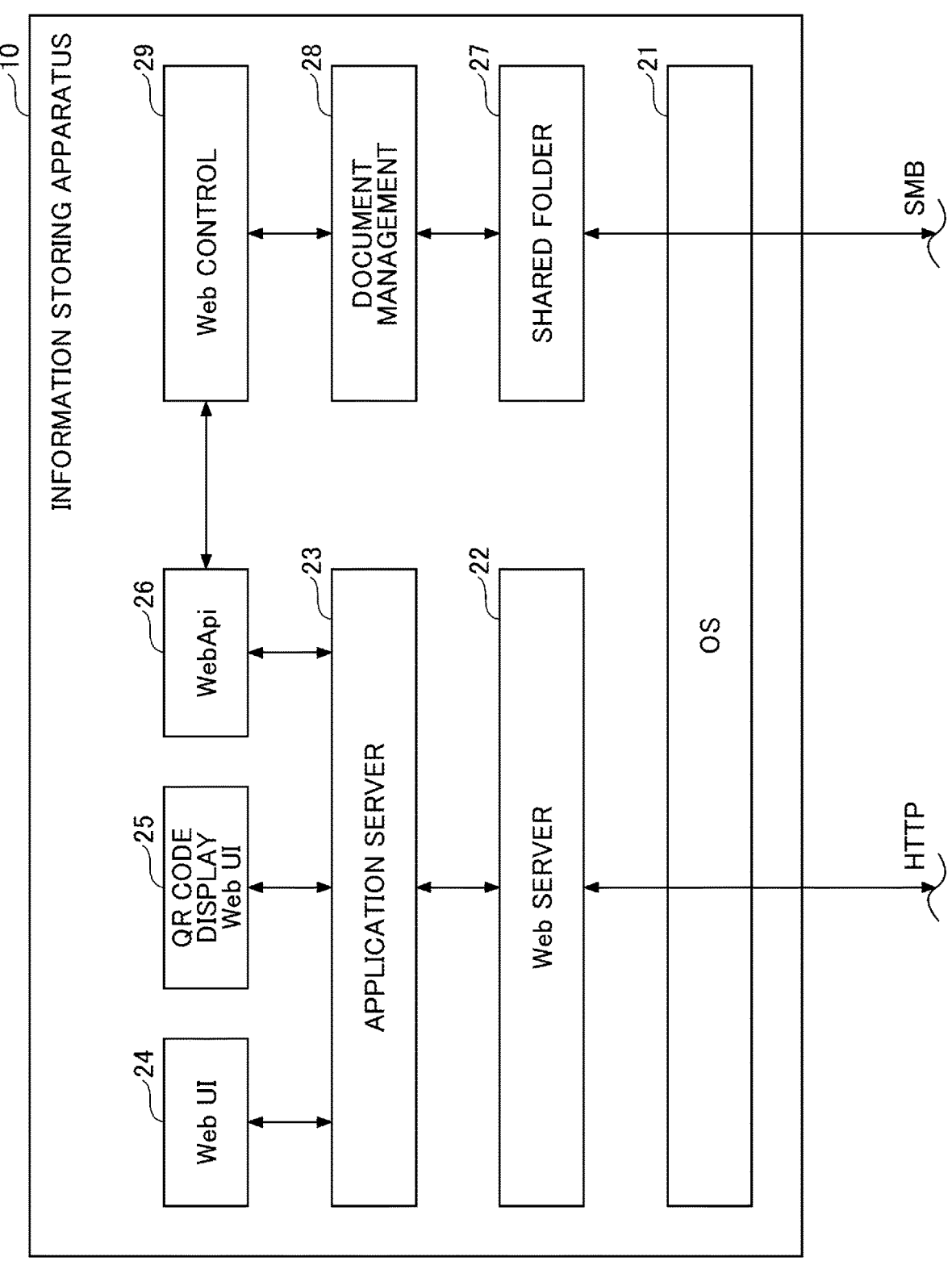
FIG. 3 is a processing block diagram of one example of an information storing apparatus according to the first embodiment.

The information storing apparatus 10 according to the first embodiment includes the processing blocks shown in FIG. 3, for example. The information storing apparatus 10 executes a program(s), and thus, realizes respective functions of an OS 21, a Web server 22, an application server 23, a Web UI 24, a QR code display Web UI 25, a WebApi 26, a shared folder 27, a document management part 28 and a Web control part 29.

The OS 21 is the OS of the information storing apparatus 10, and controls the entirety of the system of the information storing apparatus 10. The OS 21 is, for example, Windows (registered trademark), Linux (registered trademark) or the like. The Web server 22 is software for transmitting and receiving information using Hyper Text Transfer Protocol (HTTP). The Web server 22 is, for example, Apache (registered trademark), IIS (registered trademark) or the like.

The application server 23 is software operating as plug-in of the Web server 22, for example. The application server 23 is, for example, Tomcat (registered trademark) or the like.

The Web UI 24 displays a system setting screen page in response to a HTTP request. A user can change settings via the system setting screen page using a Web browser (not shown).

The QR code display Web UI 125 displays, on the electronic device such as the MFP 13, a screen page of QR code (registered trademark) as one example of code information, in response to a HTTP request. The QR code is a two-dimensional code of a matrix type.

The Web Application programming interface (WebApi) 26 can be used via the network N1. The WebApi receives an HTTP request, carries out a process(s) according to the HTTP request, and sends an HTTP response.

The WebApi 26 is an interface that is previously defined and provided for receiving a request from the information processing apparatus such as the smartphone 11, the tablet terminal 12 or the like, and includes a function(s), a class(es) and/or the like.

Further, it is possible to provide the WebApi 26 in a form of a Software Development Kit (SDK), to a developer who develops applications to be installed in the information processing apparatus(es). The developer can develop application(s) using the SDK. The SDK may also be provided to a third vender other than a person who provides the information storing apparatus 10. The third vendor can develop an application(s) using the provided SDK. The application(s) developed using the SDK can be installed in the information processing apparatus(s).

By thus providing the WebApi of the information storing apparatus 10 as a SDK, it is possible to install, in the information processing apparatus(es), not only an application(s) developed by a person who provides the information storing apparatus 10 but also an application(s) developed by a third vendor.

The shared folder 27 is a folder published to the network N1 by a Server Message Block (SMB) protocol. A user can access the shared folder 27 using the information processing apparatus such as the smartphone 11 or the tablet terminal 12.

The document management part 28 manages a file(s) placed in the shared folder 27 and carries out data conversion in response to a request given by the Web control part 29. It is noted that a "file(s)" in the first embodiment is(are) one form of data. The Web control part 29 carries out a process of controlling the document management part 28 in response to a request given by the WebApi 26.

It is noted that, generally, two processes operate in the information storing apparatus 10. One of these two processes includes the Web server 22, the application server 23, the Web UI 24, the QR code display Web UI 25 and the WebApi 26. The other process includes the shared folder 27, the document management part 28 and the Web control part 29. Therefore, the WebApi 26 and the Web control part 29 carry out interprocess communication.

<Details of Processing>

Below, details of processing of the service providing system 1 according to the first embodiment will be described.

Figure 4:
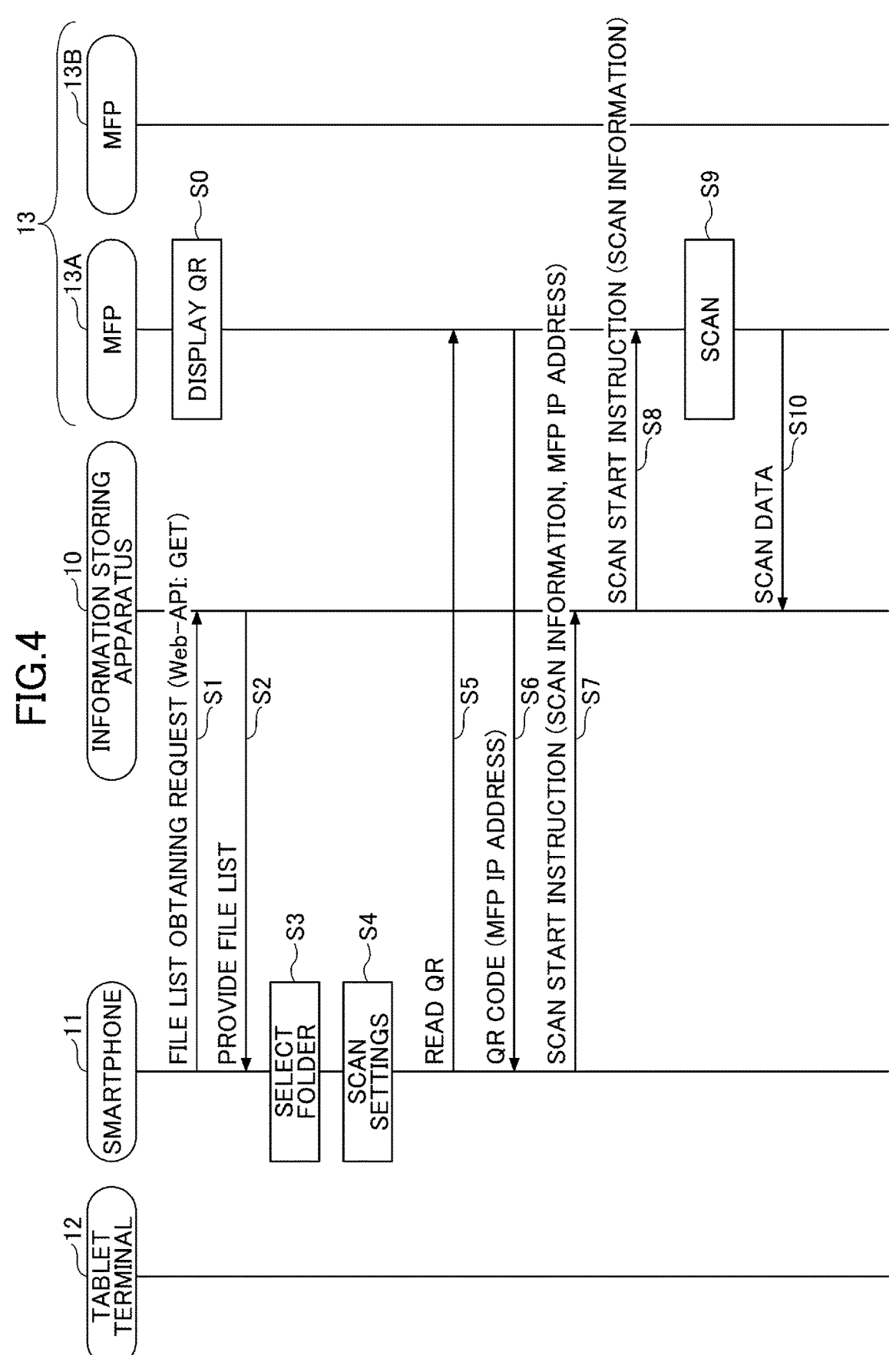
FIG. 4 is a sequence diagram of one example of a procedure of the service providing system according to the first embodiment.

Here, processing will be described for a case where, using the smartphone 11, the MFP 13 is caused to carry out scan and, data obtained from the scan is stored in the information storing apparatus 10. FIG. 4 is a sequence diagram of one example showing a procedure of the service providing system 1 according to the first embodiment.

A user operates the smartphone 11, and selects a file list display process. When the file list display process has been thus selected by the user, the smartphone 11 sends a file list obtaining request to the information storing apparatus 10 by, for example, a HTTP request (GET), in step S1.

Then, in step S2, the WebApi 26 of the information storing apparatus 10 receives the file list obtaining request, and sends a file list obtaining request to the Web control part 29. The Web control part 29 responds to the file list obtaining request sent by the WebApi 29, obtains a file list from the document management part 28 and returns the file list to the WebApi 26. The WebApi 26 provides the file list to the smartphone 11 via a HTTP response such as that shown in FIG. 5.

FIG. 5 is a configuration diagram of one example of a response to a file list obtaining request such as that mentioned above. The response of FIG. 5 has a JSON format. However, the format of the response is not limited thereto, and any other format can be used as long as it is possible to display a file list by the smartphone 11. An application installed in the smartphone 11 displays, based on such a response to the file list obtaining request shown in FIG. 5, a file list (including folder(s)) published by the information storing apparatus 10.

Figure 6:
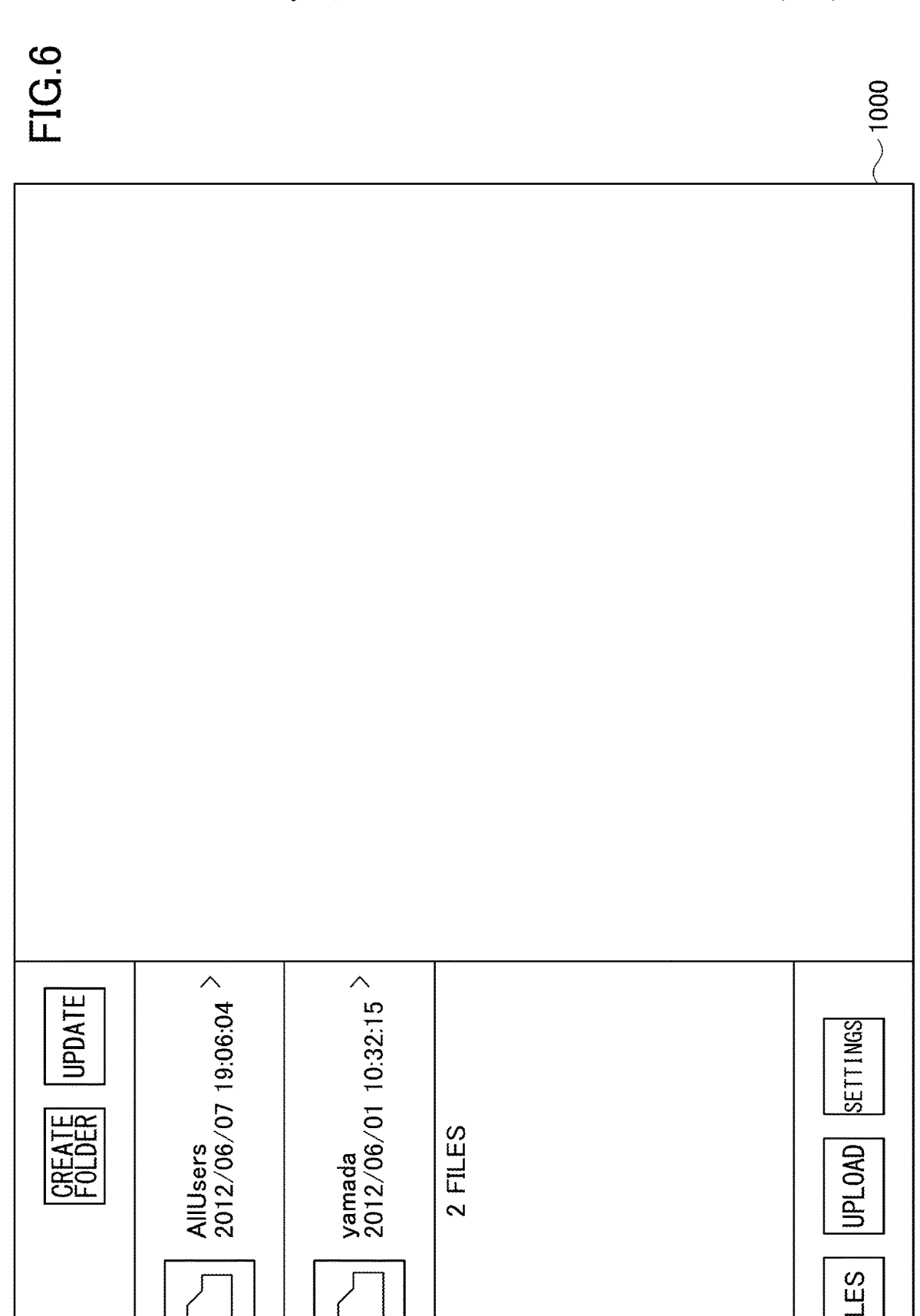
FIG. 6 is an image diagram of one example of an IT folder selection screen page.
Figure 7:
FIG. 7 is an image diagram of one example of a folder display screen page.

By repeating the processes of steps S1 and S2, the smartphone 11 displays screen pages such as those shown in FIGS. 6 and 7. FIG. 6 is an image diagram of one example of an IT folder selection screen page. Via the IT folder selection screen page 1000 of FIG. 6, the user can select, as an IT folder, either "AllUsers" or "yamada".

FIG. 7 is an image diagram of one example of a folder display screen page. The folder display screen page 1010 of FIG. 7 is a screen page example displayed after the "AllUsers" IT folder has been selected from the IT folder selection screen page 1000 of FIG. 6. On the folder display screen page 1010 of FIG. 7, "category", "data" and "workflow" are displayed as folders. When an "upload" button 1011 has been pressed on the folder display screen page 1010 of FIG. 7, the smartphone 11 displays an upload screen page 1020 shown in FIG. 8.

Figure 8:
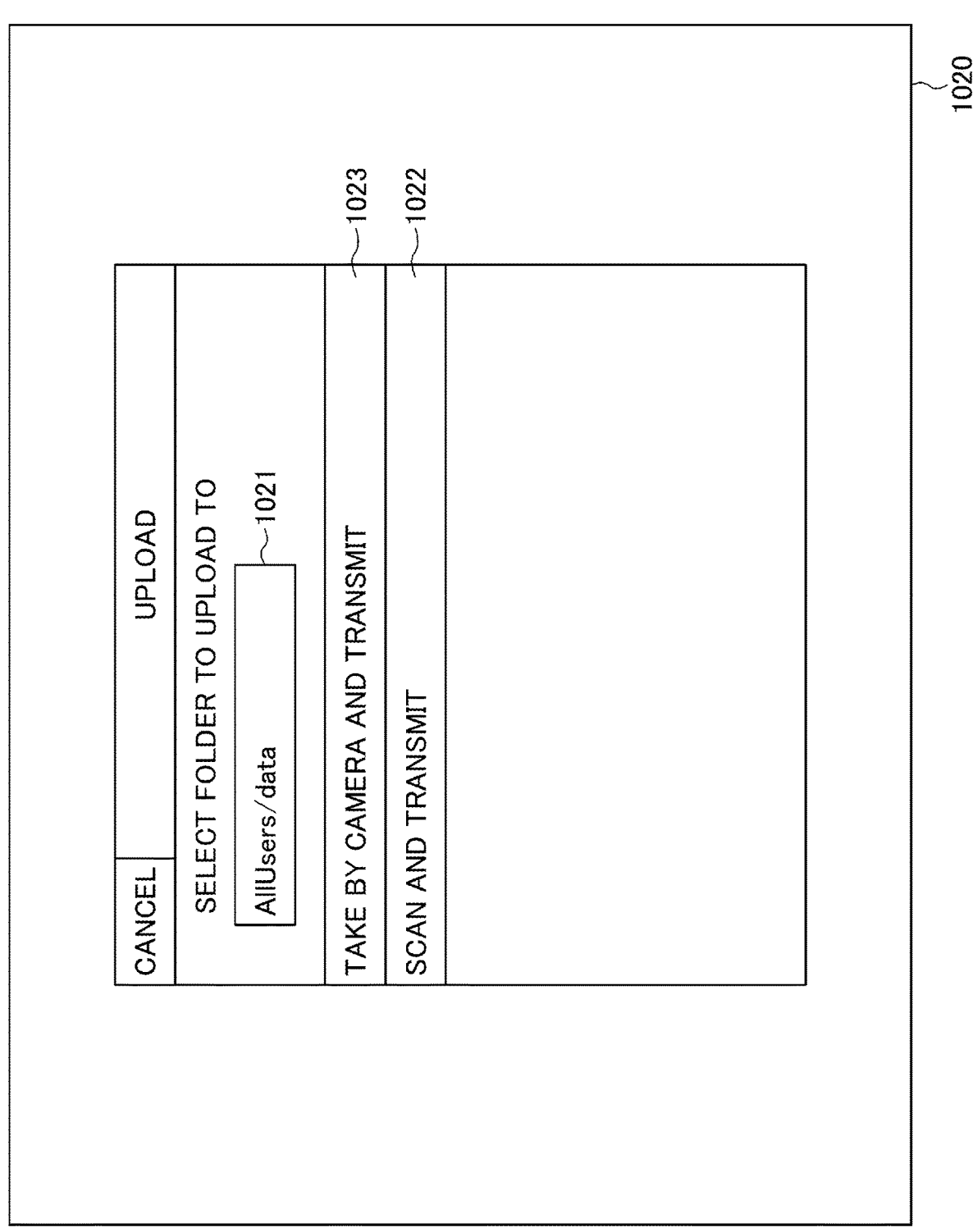
FIG. 8 is an image diagram of one example of an upload screen page.
Figure 9:
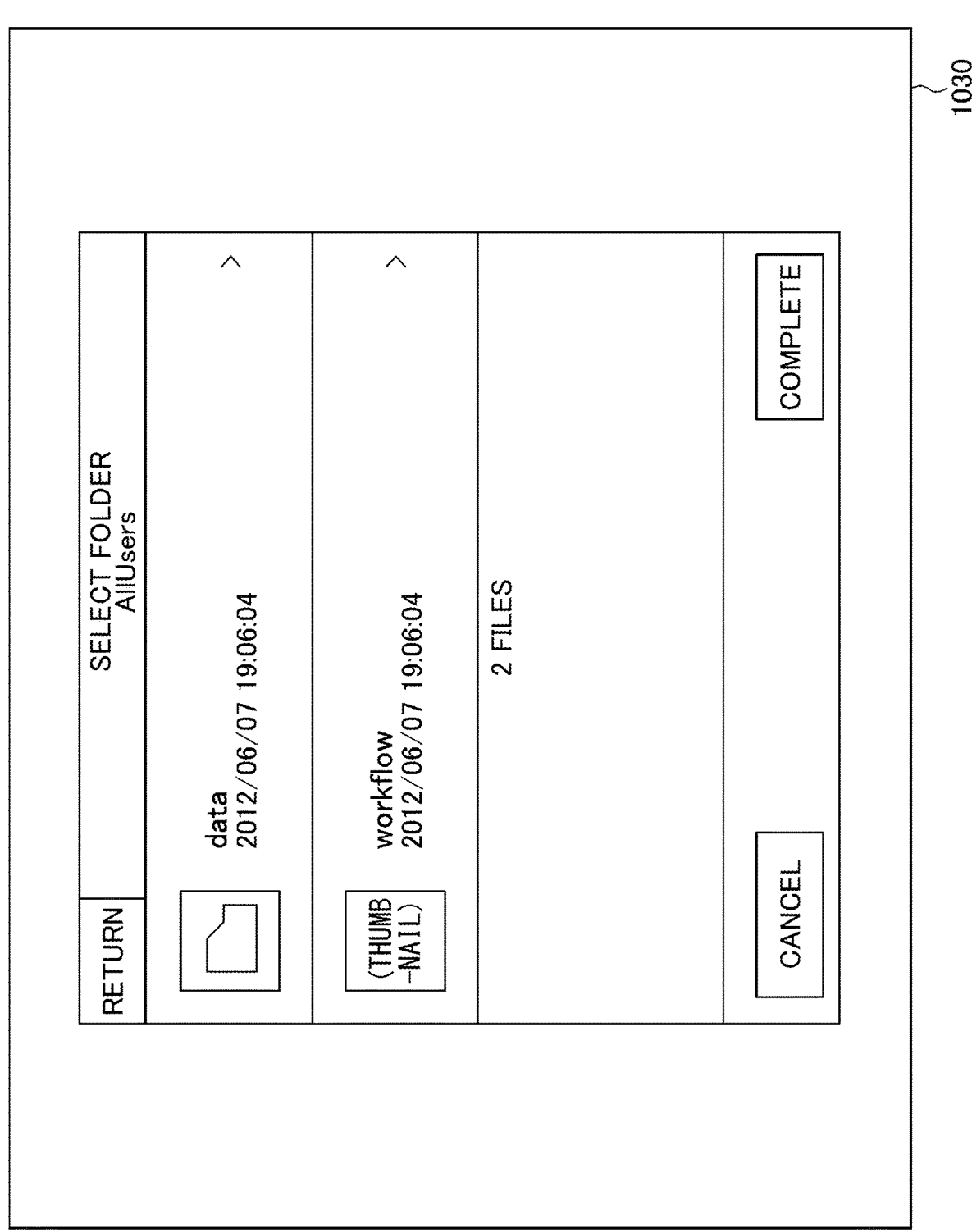
FIG. 9 is an image diagram of one example of a folder selection screen page.

FIG. 8 is an image diagram of one example of an upload screen page. The upload screen page of FIG. 8 has a "folder selection button" 1021 for a user to select a folder (upload destination) to which uploading is to be carried out. When the "folder selection button" 1021 has been pressed, the smartphone 11 displays a folder selection screen page 1030 of FIG. 9. FIG. 9 is an image diagram of one example of a folder selection screen page 1030. A user can select a folder to which uploading is to be carried out from the folder selection screen page 1030.

Further, the upload screen page 1020 of FIG. 8 also has a "take by camera and transmit" button 1023 and a "scan and transmit" button 1022 as examples of buttons for a user to designate a method of generating a file to be uploaded to the folder to which uploading is to be carried out. A user presses the "scan and transmit" button 1022 when the user wishes to cause the MFP 13 to carry out scan and store data obtained from the scan in the information storing apparatus 10 using the smartphone 11.

On the other hand, the user can press the "take by camera and transmit" button 1023 when the user wishes to use a camera function of the smartphone 11 to photograph a document or the like and store data obtained from the photographing in the information storing apparatus 10.

In step S3, the user operates the smartphone 11 and selects a folder in which scan data is to be stored from among folders shown in the folder selection screen page 1030 of FIG. 9. A description will now be described assuming that a "data" folder has been thus selected from the folder selection screen page 1030.

Figure 10:
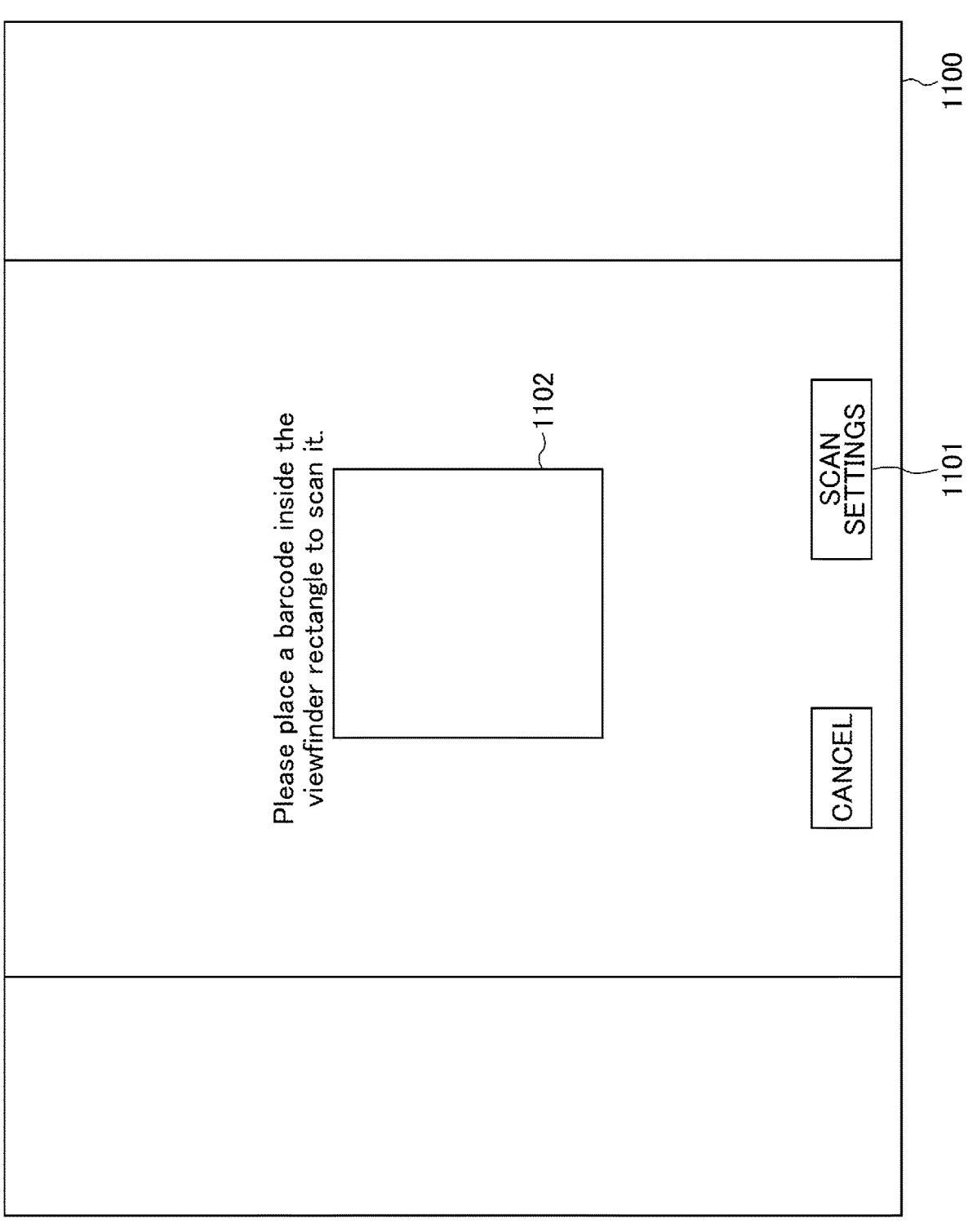
FIG. 10 is an image diagram of one example of a QR code reading screen page.

The user then operates the smartphone 11 and presses the "scan and transmit" button 1022 so as to cause the smartphone 11 to display, for example, a QR code reading screen page 1100, shown in FIG. 10. FIG. 10 is an image diagram of one example of the QR code reading screen page 1100 displayed on the smartphone 11. The QR code reading screen page 1100 includes a "scan settings" button 1101 and a QR code display area 1102. The QR code display area 1102 is an area in which an image taken by the camera function of the smartphone 11 will be displayed.

Figure 11:
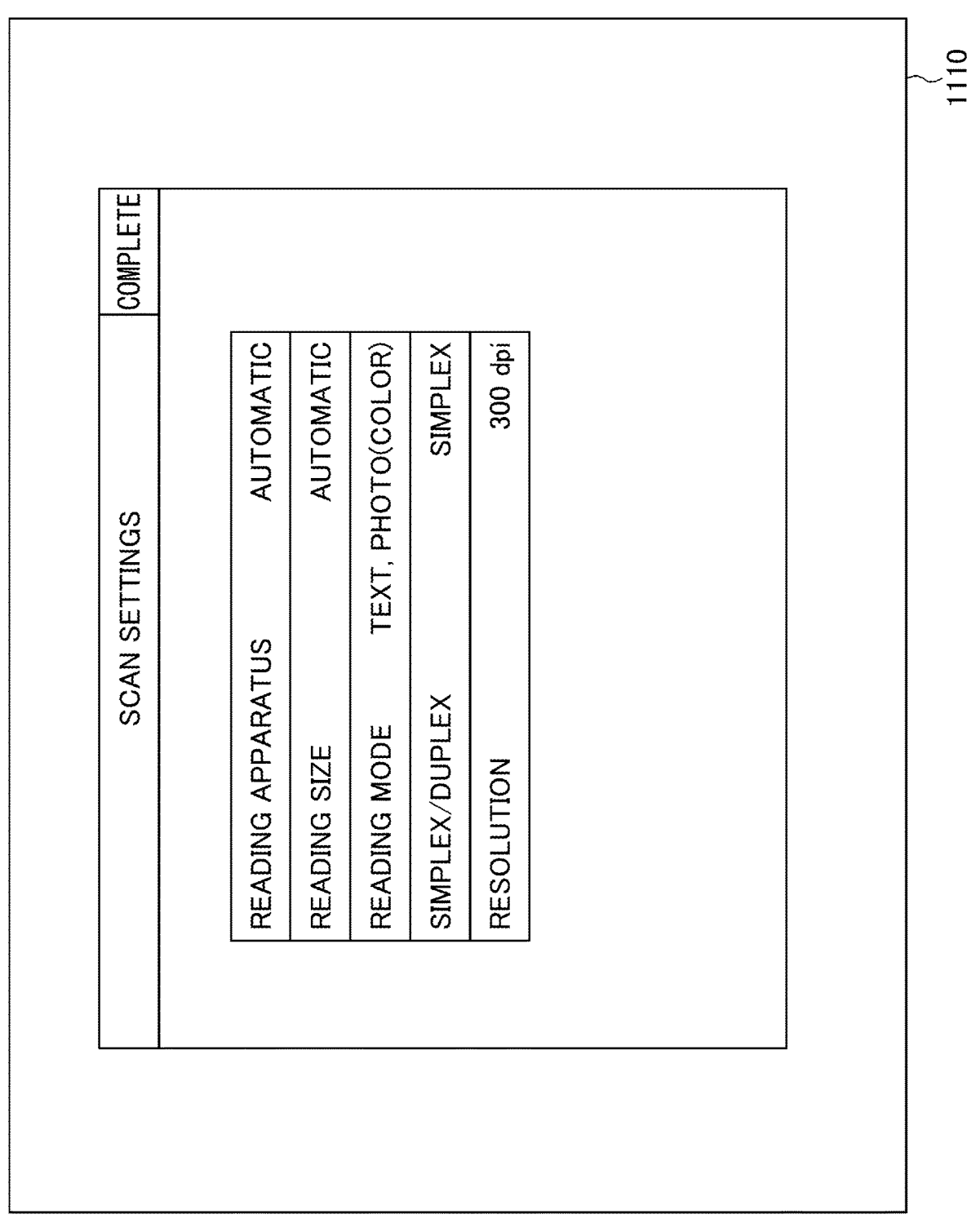
FIG. 11 is an image diagram of one example of a scan setting screen page.

Then, in step S4, by pressing the "scan settings" button 1101, for example, the user can cause a scan setting screen page 1110 shown in FIG. 11 to be displayed on the smartphone 11, and carries out scan settings. FIG. 11 is an image diagram of one example of a scan setting screen page. The user operates the smartphone 11 and carries out settings for scan to be carried out by the MFP 13A (one of the MFPs 13) via the scan setting screen page 1110 of FIG. 11.

It is noted that timing of carrying out scan settings of step S4 is not limited to the timing of FIG. 4. Scan settings can be carried out before the file list obtaining request of step S1, or before the folder selection of step S3.

In steps S5 and S6 of FIG. 4, the user operates the smartphone 11, and adjusts a positional relationship between the QR code displayed on the MFP 13A (step S0) and the smartphone 11 so that the QR code, an image of which is thus taken by the camera function of the smartphone 11, will be displayed in the QR code display area 1102 of the QR code reading screen page 1100 (see FIG. 10) displayed on the smartphone 11.

The application of the smartphone 11 reads, from the QR code, an image of which has been thus taken by the camera function, the IP address and function information of the MFP 13A, as shown in FIG. 12. FIG. 12 is a configuration diagram of one example of the information that the application of the smartphone 11 reads information from the QR code displayed in step S0 of FIG. 4.

It is noted that, a specific method of obtaining the IP address and function information of the MFP 13A or the like is not limited to the above-mentioned method of obtaining information from a QR code by photographing it. It is also possible to obtain the IP address and function information of the MFP 13A or the like using a communication way for sending and receiving information between the smartphone 11 and the MFP 13A or the like. For example, infrared communication, Bluetooth, NFC or the like can be used for this purpose. Thus, various methods can be used even without using a QR code.

In step S7, the application of the smartphone 11 sends a scan start instruction to the information storing apparatus 10. The scan start instruction includes scan information and the IP address of the MFP 13A which is to carry out scan.

One method of sending a scan start instruction to the information storing apparatus 10 is to write a file that includes scan information and the IP address of the MFP 13A which is to carry out scan in a predetermined folder of the information storing apparatus 10.

FIG. 13 is a configuration diagram of one example of scan information included in the file. Scan information of FIG. 13 includes the scan settings that have been set via the scan setting screen page 1110 of FIG. 11 and the path "AllUsers/data/" of a folder which is to store scan data.

The information storing apparatus 10 monitors the predetermined folder through polling. When the file that includes the scan information and the IP address of the MFP 13A which is to carry out scan has been written in the predetermined folder, the information storing apparatus 10 sends a scan start instruction to the MFP 13A based on the file thus written in the predetermined folder, in step S8. It is noted that sending the scan start instruction of step S7 may be carried out using the WebApi 26. It is noted that, instead of sending the scan start instruction from the information storing apparatus 10 to the MFP 13A, the MFP 13A may obtain the scan start instruction from the information storing apparatus 10 by carrying out polling on the information storing apparatus 10.

Sending the scan start instruction in step S8 is carried out, for example, using commands shown in FIG. 14. FIG. 14 is a configuration diagram of one example of commands to be used for a scan start instruction to be sent to the MFP 13A or the like. The commands of FIG. 14 include a command indicating the path of the folder which is to store scan data" and a command indicating the scan settings.

In step S9, the MFP 13A carries out scan based on the scan settings included in the scan start instruction given by the information storing apparatus 10. In step S10, the MFP 13A stores scan data obtained from the scan in the folder of the information storing apparatus 10 which the user has selected in step S3, based on "the path of the folder which is to store scan data" included in the scan start instruction given by the information storing apparatus 10.

It is noted that the information storing apparatus 10 can cause the MFP 13A to carry out scan via the network N1 by using Javascript (registered trademark) for scan published by the MFP 13A, for example.

Figure 15:
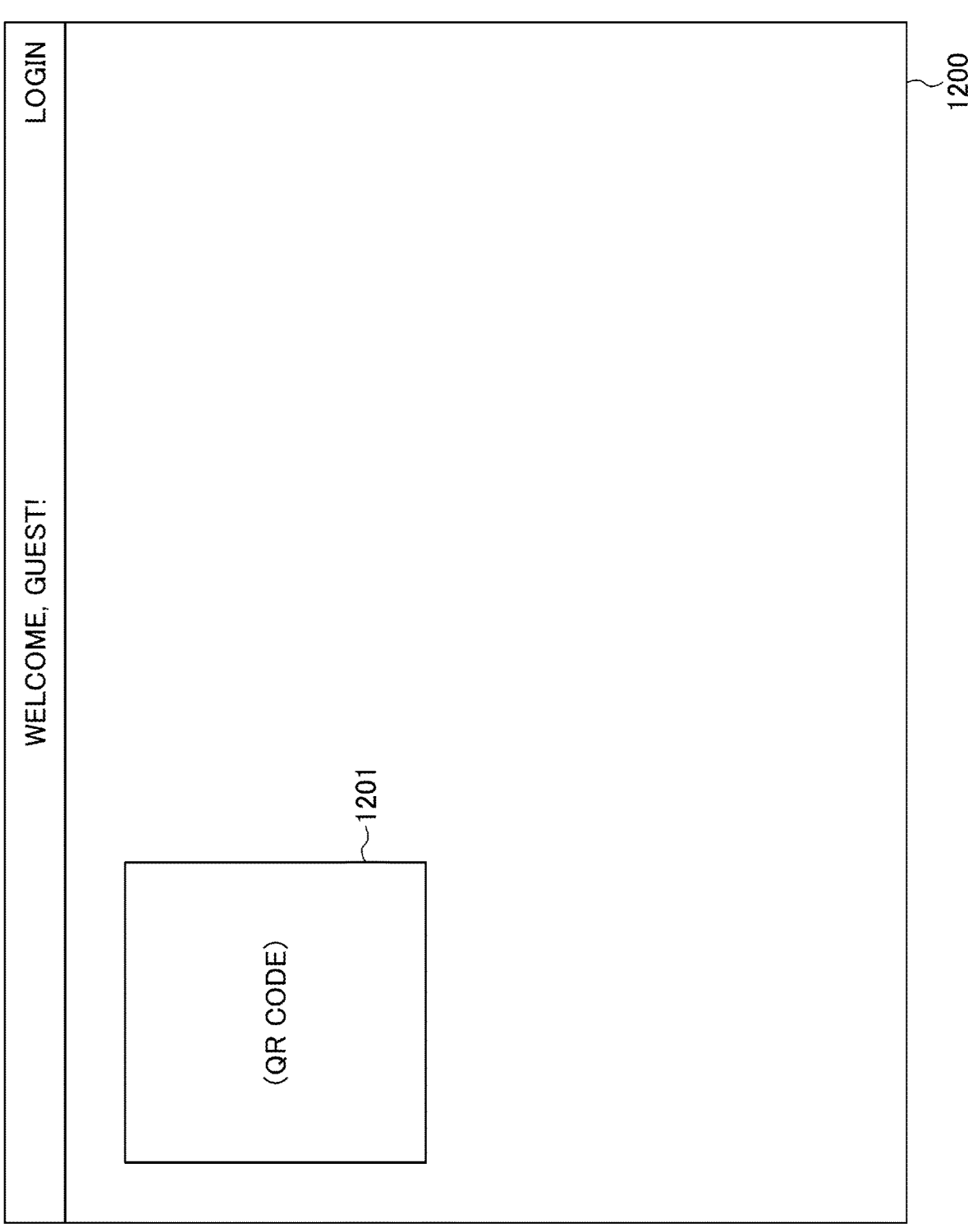
FIG. 15 is an image diagram of one example of a QR code displayed on the MFP.

Further, the MFP 13A can display (in step S0), via a Web browser (not shown), a screen page 1200 including a QR code 1201 as shown in FIG. 15 on an operation panel or the like of the MFP 13A as a result of displaying the QR code display Web UI 25 of the information storing apparatus 10.

Figure 16:
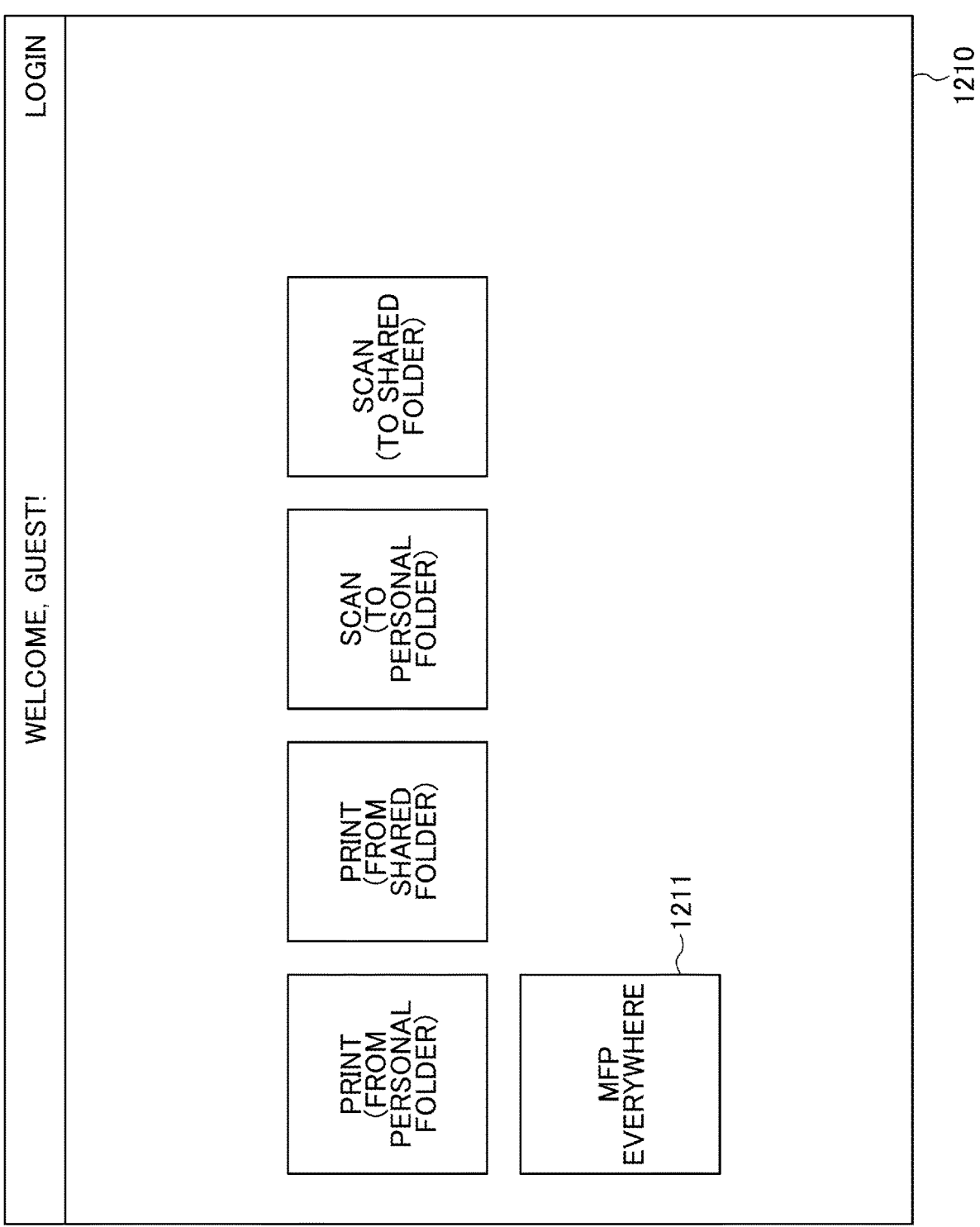
FIG. 16 is an image diagram of one example of a top screen page displayed on the MFP.

FIG. 15 is an image diagram of one example of a QR code thus displayed on the MFP 13A. It is noted that the screen page 1200 of FIG. 15 is displayed as a result of a "MFP Everywhere" button 1211 on the top screen page 1210 of the Web browser (not shown) of the MFP 13A shown in FIG. 16 being pressed, for example. FIG. 16 is an image diagram of one example of the top screen page displayed on the MFP 13A or the like.

It is noted that, although the example of displaying the QR code 1201 on the screen page 1200 in FIG. 15 has been described, it is also possible to affix a seal of the QR code 1201 onto the housing of the MFP 13A, as another example. Further, it is possible that the MFP 13 stores image data of the QR code 1201 in the MFP 13 itself. Other than affixing a seal of the QR code 1201 on the housing of the MFP 13A, it is also possible to affix a seal of the QR code 1201 on, for example, a wall of a room in which the MFP 13A is installed. In other words, a specific position to affix a seal of the QR code 1201 is preferably a position such that a user can understand that the QR code 1201 is one that is associated with the MFP 13A.

Figure 17:
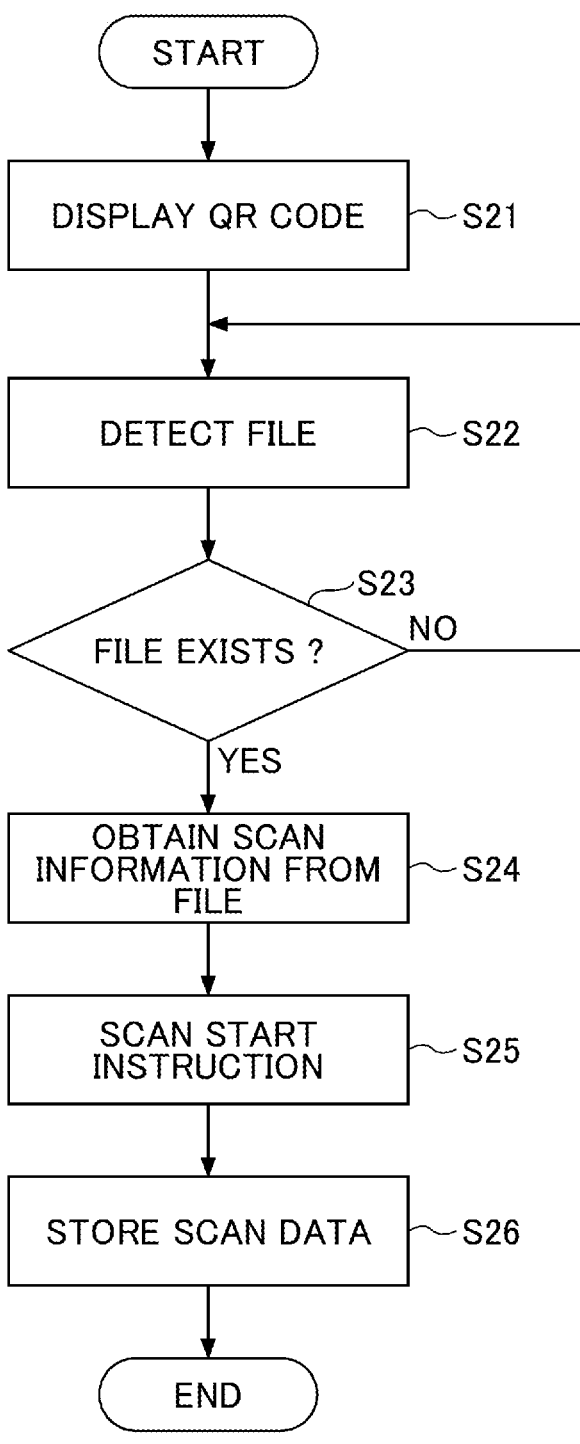
FIG. 17 is a flowchart of one example showing a procedure of the information storing apparatus.

FIG. 17 is a flowchart of one example of a procedure of the information storing apparatus 10. In step S21, the information storing apparatus 10 causes the QR code 1201 to be displayed on the screen page 1200 of the MFP 13A.

In step S22, the information storing apparatus 10 determines whether a file in which the scan information and the IP address of the MFP 13A which is to carry out scan are included has been written in the predetermined folder. The information storing apparatus 10 repeats the process of step S22 until determining that a file in which the scan information and the IP address of the MFP 13A which is to carry out scan are included has been written in the predetermined folder.

When having determined that a file in which the scan information and the IP address of the MFP 13A which is to carry out scan are included has been written in the predetermined folder, the information storing apparatus 10 obtains the scan information from the file written in the predetermined folder, in step S24.

Then, in step S25, the information storing apparatus 10 selects the MFP 13A to which a scan start instruction is to be sent, based on the "IP address of the MFP 13A which is to carry out scan" included in the file written in the predetermined folder, and sends a scan start instruction to the MFP 13A based on the scan information included in the file written in the predetermined folder.

In step S26, the information storing apparatus 10 stores scan data thus obtained from the MFP 13A in the folder that the user has selected in step S3, based on "the path of the folder which is to store scan data" included in the scan start instruction.

According to the sequence diagram of FIG. 4, it is possible to display, on the smartphone 11, a folder of the information storing apparatus 10, by installing the WebApi 26 in the information storing apparatus 10. A user can store scan data in a selected folder of the information storing apparatus 10, by selecting the folder via the smartphone 11 and reading via the smartphone 11 information from the QR code 1201 of the MFP 13A that the user wishes to use for carrying out scan.

Thus, by holding the smartphone 11 against the MFP 13A at a time of starting scan (to cause the smartphone 11 to read information from the QR code of the MFP 13A), a user can easily store scan data obtained from scan carried out by the MFP 13A in a selected folder of the information storing apparatus 10, as a result of the information storing apparatus 10, the smartphone 11 and the MFP 13A operating in cooperation with each other.

The sequence diagram of FIG. 4 shows the process of causing the MFP 13A to carry out scan, and storing, in the information storing apparatus 10, data (scan data) obtained from the scan, using the smartphone 11. The service providing system 1 according to the first embodiment can also be used, as shown in FIG. 18, to cause the MFP 13A to carry out scan, and store, in the information storing apparatus 10, data (scan data) obtained from the scan, using the tablet terminal 12.

Figure 18:
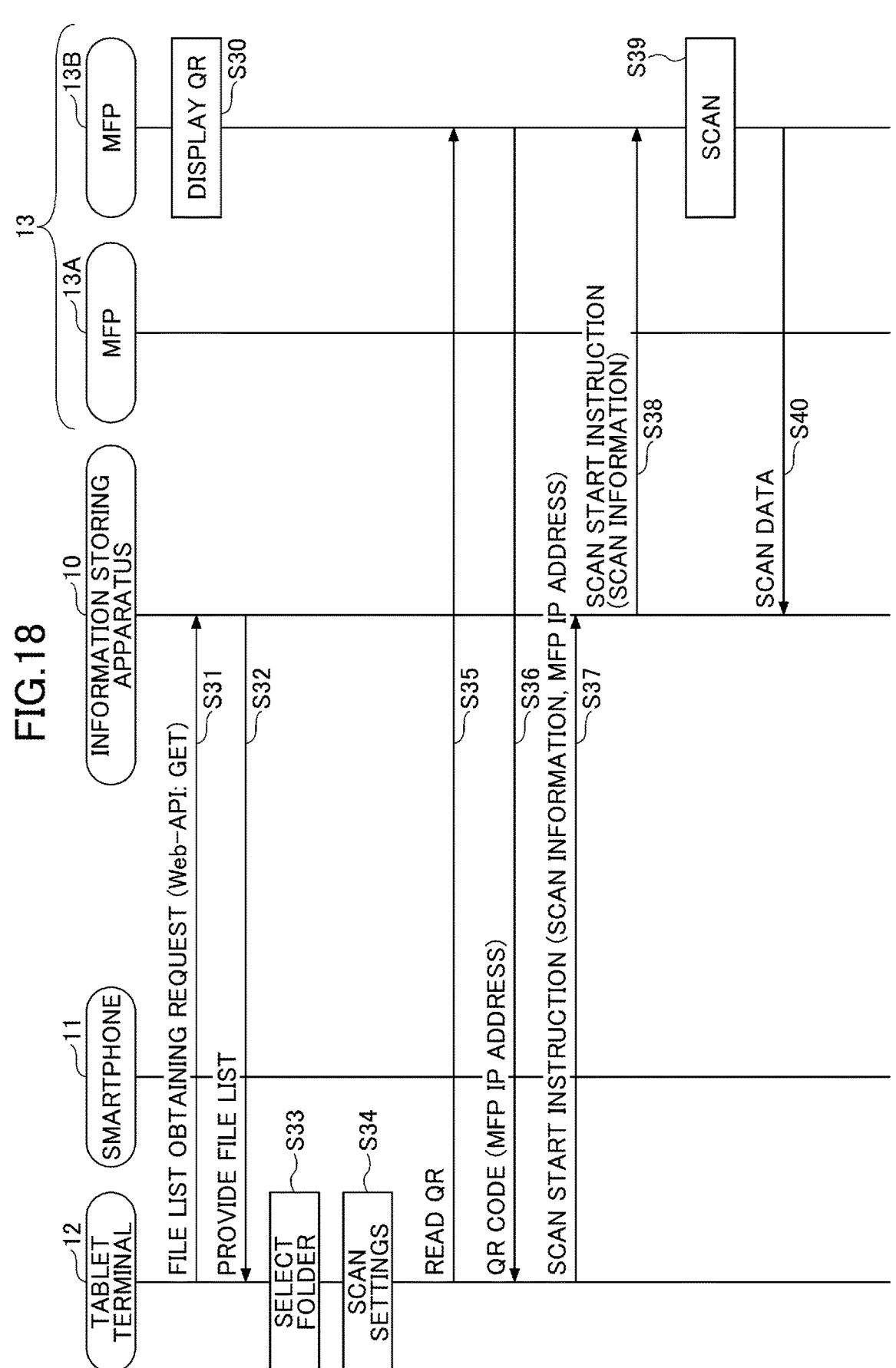
FIG. 18 is a sequence diagram of another example showing a procedure of the service providing system according to the first embodiment.

FIG. 18 is a sequence diagram of another example showing a procedure of the service providing system 1 according to the first embodiment. It is noted that the processes of step S30 and steps S31 to S40 of FIG. 18 are the same as those of step S0 and steps S1 to S10 of FIG. 4, and thus, duplicate description will be omitted.

In the sequence diagrams of FIGS. 4 and 18, the processes have been shown for a case where the MFP 13A stores, in the information storing apparatus 10, data (scan data) obtained from scan carried out by the MFP 13A. However, the service providing system 1 according to the first embodiment can also be used for a case of, as shown in a sequence diagram of FIG. 19, storing, in the information storing apparatus 10, data (scan data) obtained from scan carried out by the MFP 13A, through the smartphone 11 or the tablet terminal 12.

Figure 19:
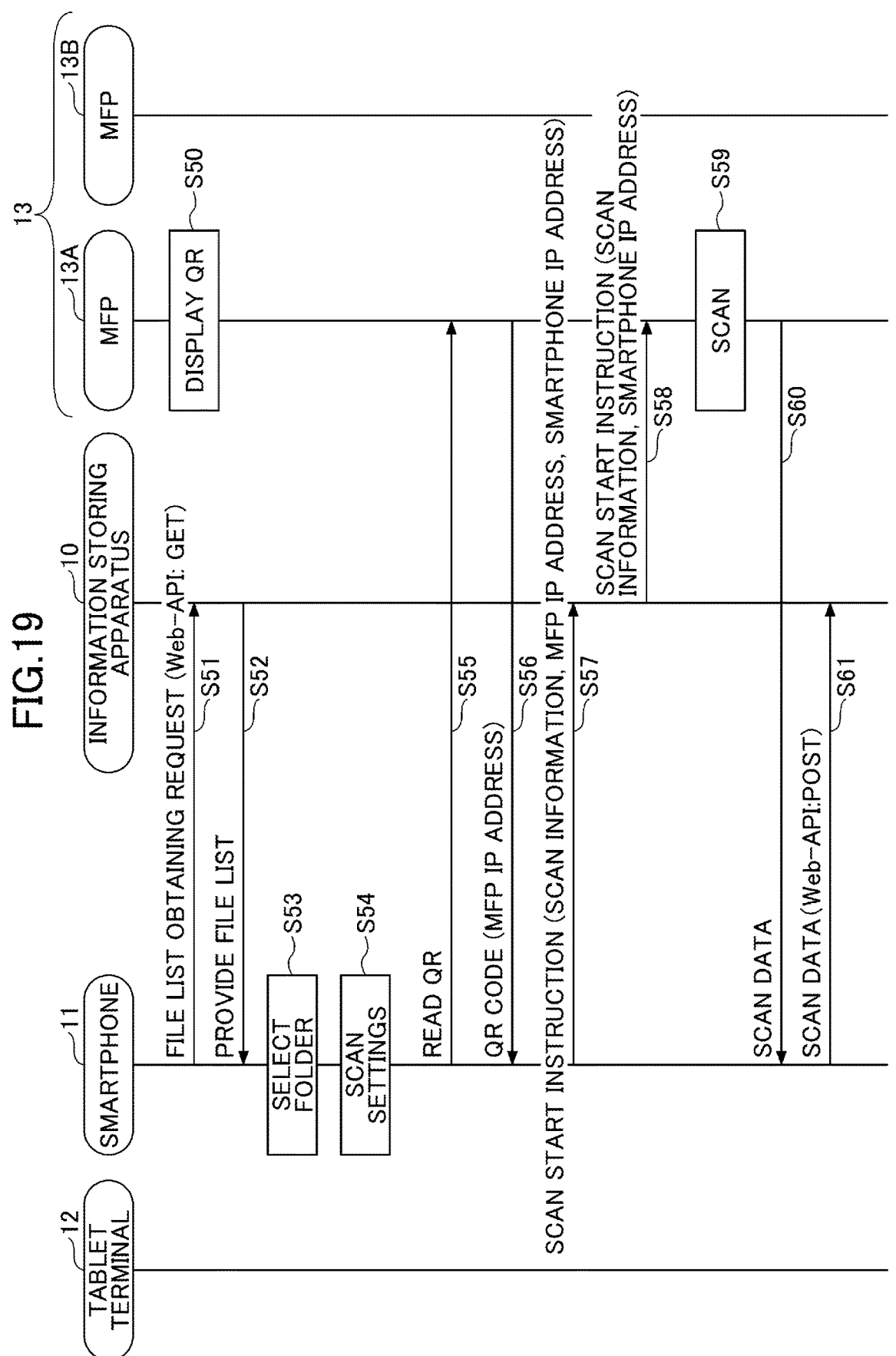
FIG. 19 is a sequence diagram of yet another example showing a procedure of the service providing system according to the first embodiment.

FIG. 19 is a sequence diagram of yet another example of a procedure of the service providing system 1 according to the first embodiment. The sequence diagram of FIG. 19 shows an example of storing, in the information storing apparatus 10, data (scan data) obtained from scan carried out by the MFP 13A, through the smartphone 11. Further, processes of step S50 and steps S51 to S56 in the sequence diagram of FIG. 19 are the same as those of step S0 and steps S1 to S6 in the sequence diagram of FIG. 4, and thus, duplicate description will be omitted.

In step S57, the application of the smartphone 11 sends a scan start instruction to the information storing apparatus 10. The scan start instruction includes the scan information, the IP address of the MFP 13A which is to carry out scan and the IP address of the smartphone 11. In the scan information included in the scan start instruction of step S57, the scan settings that have been set via the scan setting screen page 1110 of FIG. 11 are included.

When the file that includes the scan information, the IP address of the MFP 13A which is to carry out scan and the IP address of the smartphone 11 has been written in the predetermined folder, the information storing apparatus 10 sends a scan start instruction to the MFP 13A based on the file thus written in the predetermined folder, using a command that indicates the scan settings, in step S58. It is noted that, in the scan start instruction of step S58, the scan information and the IP address of the smartphone 11 are included.

In step S59, the MFP 13A carries out scan based on the scan settings included in the scan start instruction given by the information storing apparatus 10. In step S60, the MFP 13A transmits scan data obtained from the scan to the smartphone 11 based on the IP address of the smartphone 11 included in the scan start instruction.

In step S61, the smartphone 11 stores the scan data in the folder of the information storing apparatus 10 which the user has selected in step S3, via, for example, a HTTP request (POST). In this process, the WebApi 26 of the information storing apparatus 10 stores the scan data received from the smartphone 11 in the folder that the user has selected in step S3.

Although data (scan data) obtained from scan carried out by the MFP 13A is stored in the information storing apparatus 10 through the smartphone 11 or the tablet terminal 12 in the sequence diagram of FIG. 19, data (scan data) obtained from scan carried out by the MFP 13A can be stored in the smartphone 11 or the tablet terminal 12.

Figure 20:
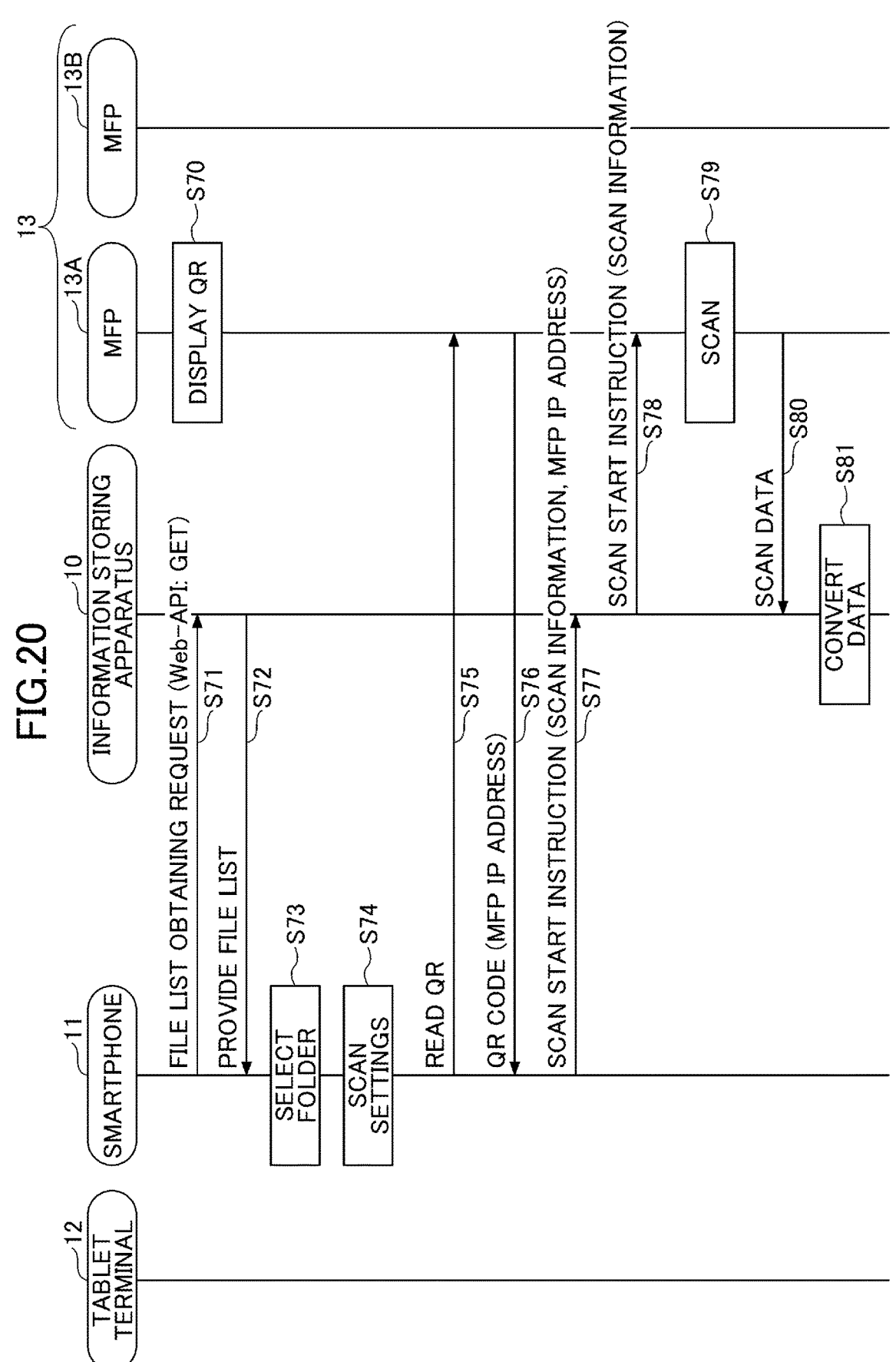
FIG. 20 is a sequence diagram of yet another example showing a procedure of the service providing system according to the first embodiment.

Further, although the process is finished when scan data is stored in the folder of the information storing apparatus 10 in the sequence diagrams of FIGS. 4, 18 and 19, it is possible to carry out data conversion or the like on the scan data that has been thus stored in the folder of the information storing apparatus 10, as shown in a sequence diagram of FIG. 20.

FIG. 20 is a sequence diagram of yet another example of a procedure of the service providing system 1 according to the first embodiment. It is noted that processes of step S70 and steps S71 to S80 in the sequence diagram of FIG. 20 are the same as those of step S0 and steps S1 to S10 in the sequence diagram of FIG. 4, and thus, duplicate description will be appropriately omitted.

In the sequence diagram of FIG. 20, a process of data conversion or the like is carried out on the stored scan data depending on the type of the folder selected in step S73, for example. The "workflow" folder shown on the folder selection screen page 1030 of FIG. 9 is a folder for which it is possible to designate a process to be carried out on the stored scan data. Therefore, by previously setting a process of data conversion to the "workflow" folder shown on the folder selection screen page 1030 of FIG. 9, the information storing apparatus 10 carries out, in step S81, a process of data conversion on the scan data that has been stored in the "workflow" folder in step S80.

Second Embodiment

In the service providing system 1 according to the first embodiment described above, a scan start instruction is sent to the electronic device (the MFP 13A, for example) from the information processing apparatus (the smartphone 11, for example) through the information storing apparatus 10. In the service providing system according to the second embodiment, a scan start instruction is sent to the electronic device (the MFP 13A, for example) directly from the information processing apparatus (the smartphone 11, for example) without inserting the information storing apparatus 10 therebetween.

The service providing system 1 according to the second embodiment has the same system configuration, hardware configuration and software configuration as those of the service providing system 1 according to the first embodiment described above. Thus, the description of the system configuration, hardware configuration and software configuration will be omitted.

<Details of Processing>

Below, processing of the service providing system 1 according to the second embodiment will be described in detail.

Figure 21:
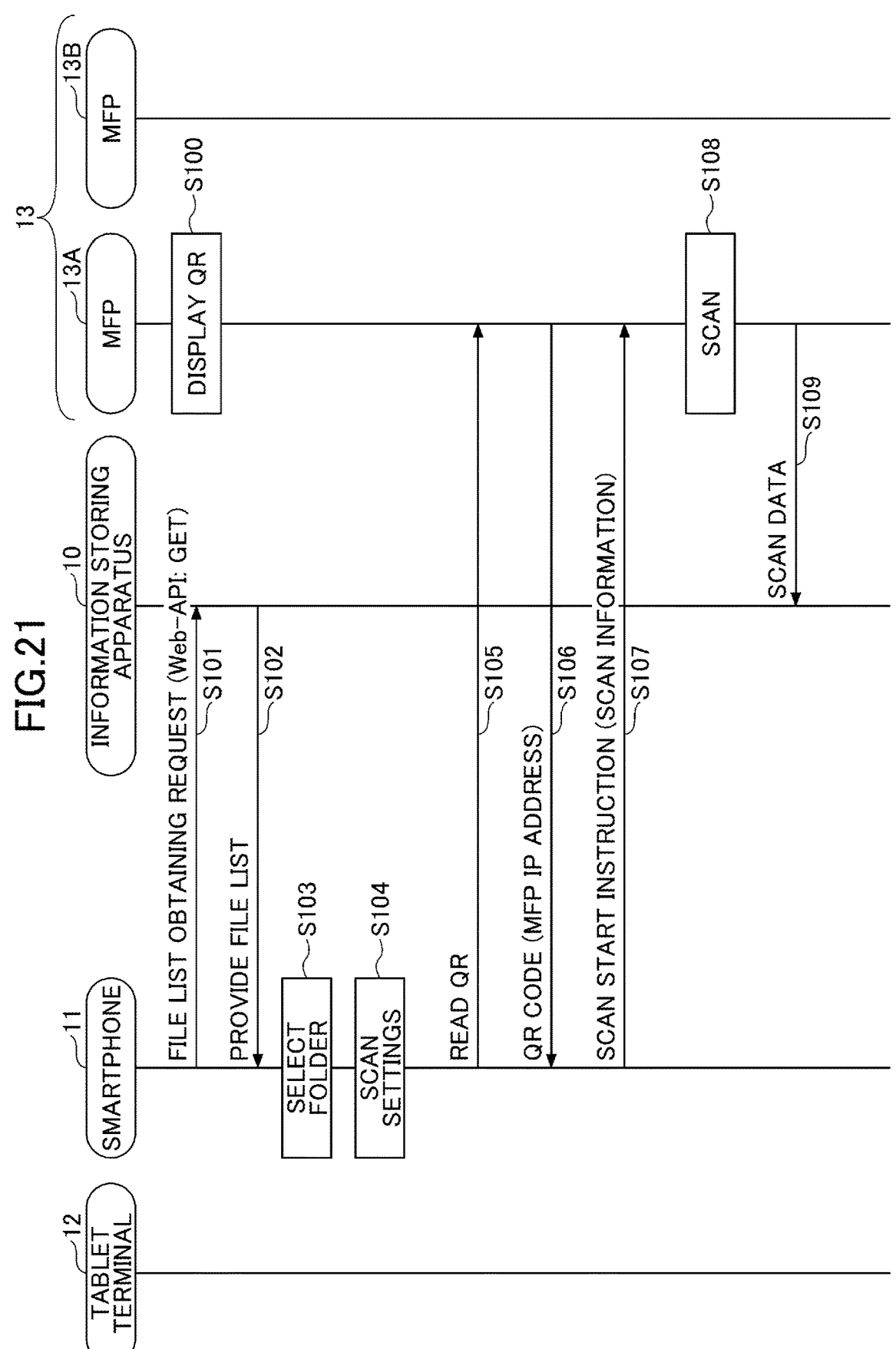
FIG. 21 is a sequence diagram of one example showing a procedure of the service providing system according to a second embodiment.

FIG. 21 is a sequence diagram of one example of a procedure of the service providing system 1 according to the second embodiment. It is noted that processes of step S100 and steps S101 to S106 in the sequence diagram of FIG. 21 are the same as those of step S0 and steps S1 to S6 in the sequence diagram of FIG. 4, and thus, duplicate description will be omitted.

In step S107, the application of the smartphone 11 sends a scan start instruction to the MFP 13A, using the IP address of the MFP 13A that has been read from the QR code photographed by the camera function. The scan start instruction includes the scan information. The smartphone 11 sends the scan start instruction, using, for example, the command(s) shown in FIG. 14.

In step S108, the MFP 13A carries out scan based on the scan settings included in the scan start instruction given by the smartphone 11. In step S109, the MFP 13A stores scan data obtained from the scan in the folder of the information storing apparatus 10 which the user has selected in step S103, based on "the path of the folder which is to store scan data" included in the scan start instruction given by the smartphone 11.

According to the sequence diagram of FIG. 21, it is possible to display, on the smartphone 11, a folder of the information storing apparatus 10, by installing the WebApi 26 in the information storing apparatus 10. A user can store scan data in a selected folder of the information storing apparatus 10, by selecting the folder via the smartphone 11 and reading via the smartphone 11 information from the QR code 1201 of the MFP 13A that the user wishes to use to carry out scan.

Thus, by holding the smartphone 11 against the MFP 13A at a time of starting scan (to cause the smartphone 11 to read information from the QR code of the MFP 13A), a user can easily store scan data obtained from scan carried out by the MFP 13A in a selected folder of the information storing apparatus 10, as a result of the information storing apparatus 10, the smartphone 11 and the MFP 13A operating in cooperation with each other.

The sequence diagram of FIG. 21 shows the process of causing the MFP 13A to carry out scan, and storing, in the information storing apparatus 10, data obtained from the scan, using the smartphone 11. The service providing system 1 according to the second embodiment can also be used, as shown in FIG. 22, to cause the MFP 13B to carry out scan, and store data obtained from the scan in the information storing apparatus 10, using the tablet terminal 12.

Figure 22:
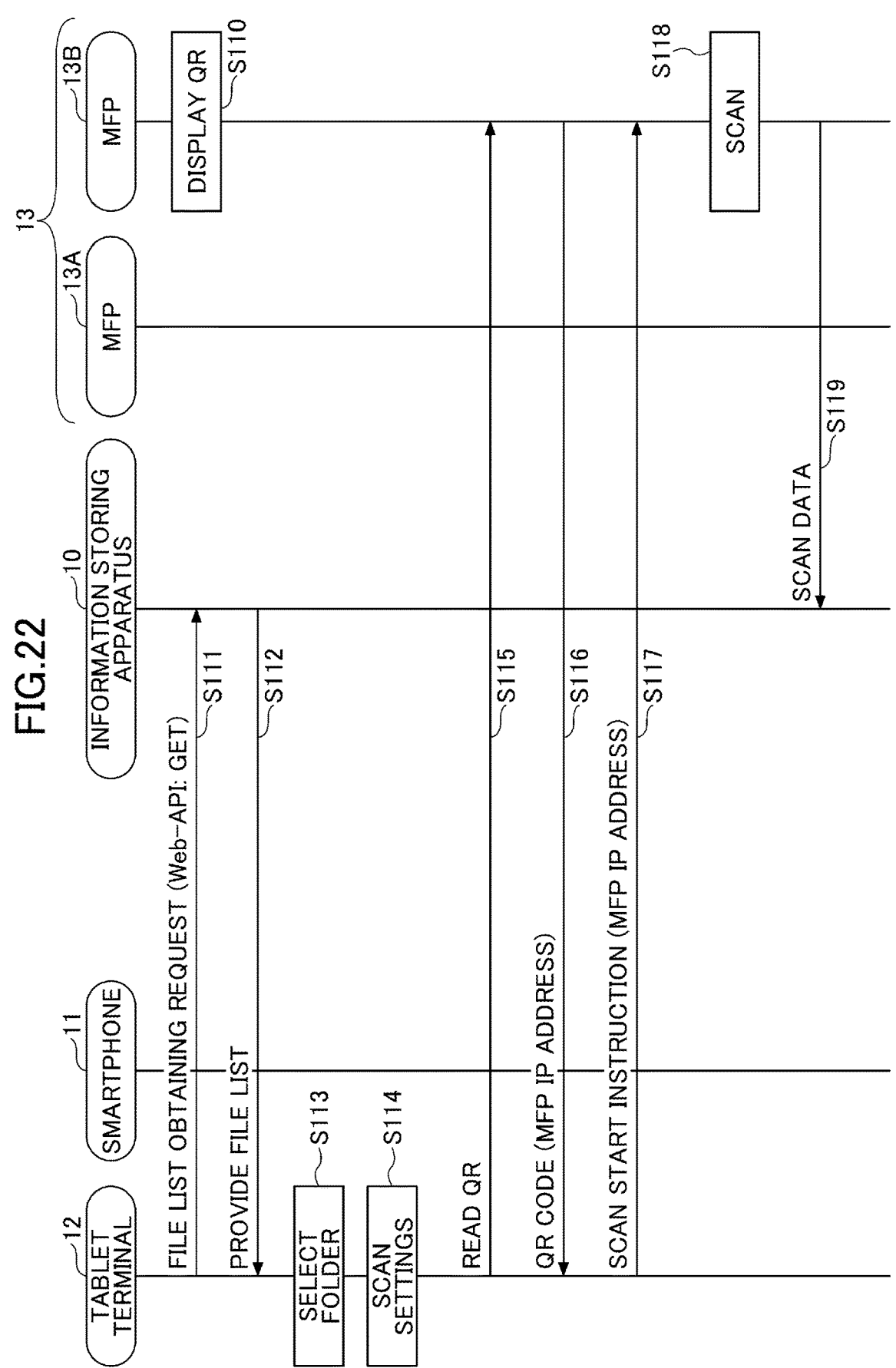
FIG. 22 is a sequence diagram of another example showing a procedure of the service providing system according to the second embodiment.

FIG. 22 is a sequence diagram of another example showing a procedure of the service providing system 1 according to the second embodiment. It is noted that the processes of step S110 and steps S111 to S119 of FIG. 22 are the same as those of step S100 and steps S101 to S109 of FIG. 21, and thus, duplicate description will be omitted.

In the sequence diagrams of FIGS. 21 and 22, the processes have been shown for a case where the MFP 13A or 13B stores, in the information storing apparatus 10, data obtained from scan carried out by the MFP 13A or 13B. However, the service providing system 1 according to the second embodiment can also be used for a case of, as shown in a sequence diagram of FIG. 23, storing, in the information storing apparatus 10, data obtained from scan carried out by the MFP 13A or 13B, through the smartphone 11 or the tablet terminal 12.

Figure 23:
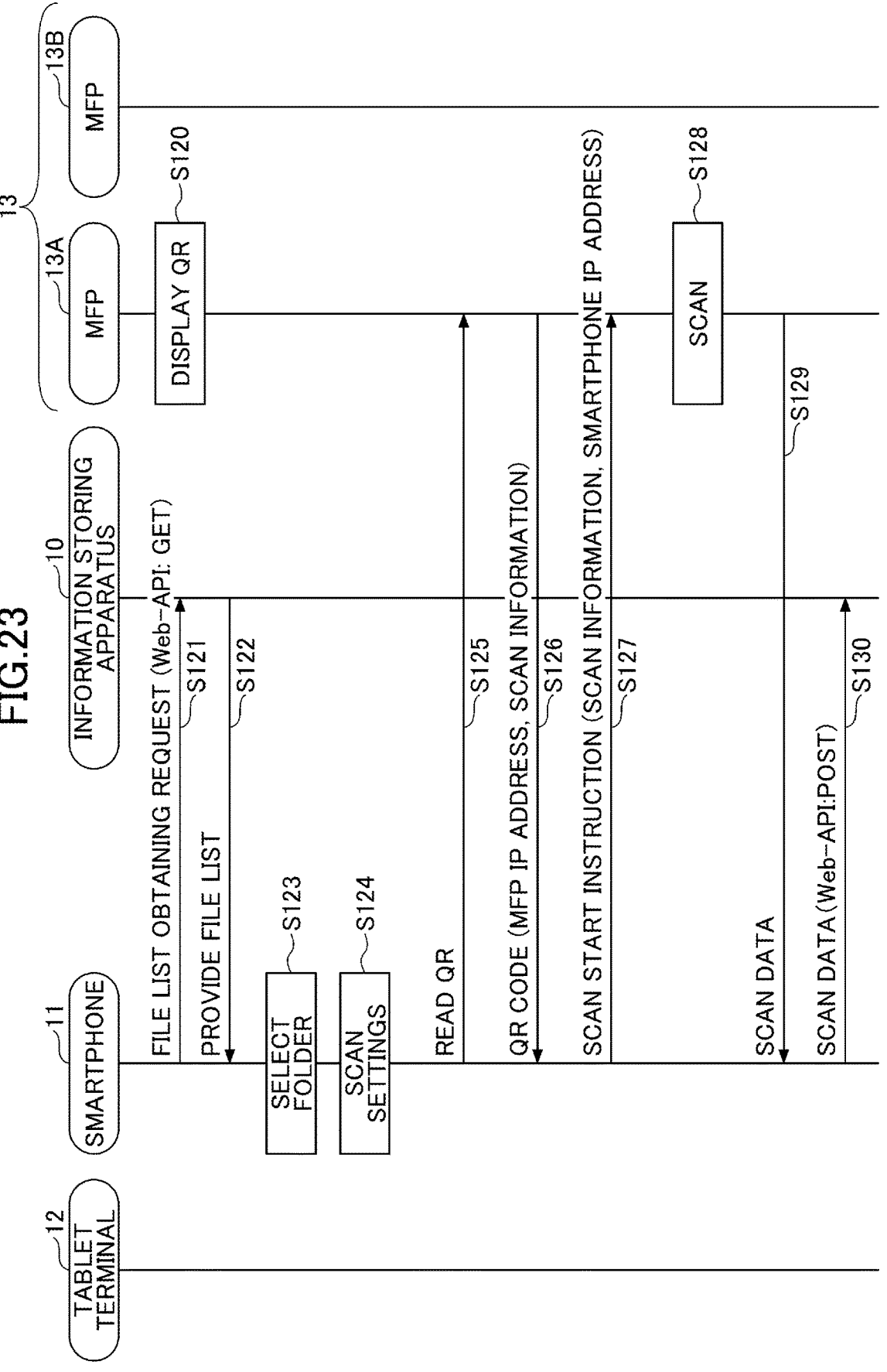
FIG. 23 is a sequence diagram of yet another example showing a procedure of the service providing system according to the second embodiment.

FIG. 23 is a sequence diagram of yet another example of a procedure of the service providing system 1 according to the second embodiment. The sequence diagram of FIG. 23 shows an example of storing data obtained from scan via the MFP 13A in the information storing apparatus 10 through the smartphone 11. Further, processes of step S120 and steps S121 to S126 in the sequence diagram of FIG. 23 are the same as those of step S100 and steps S101 to S106 in the sequence diagram of FIG. 21, and thus, duplicate description will be omitted.

In step S127, the application of the smartphone 11 sends a scan start instruction to the MFP 13A using the command indicating the scan settings. The scan start instruction includes the scan information and the IP address of the smartphone 11. In the scan information included in the scan start instruction of step S127, the scan settings that have been set via the scan setting screen page 1110 of FIG. 11 are included.

In step S128, the MFP 13A carries out scan based on the scan settings included in the scan start instruction given by the smartphone 11. In step S129, the MFP 13A transmits scan data obtained from the scan to the smartphone 11 based on the IP address of the smartphone 11 included in the scan start instruction.

In step S130, the smartphone 11 stores the scan data received from the MFP 13A in the folder of the information storing apparatus 10 which the user has selected in step S123, via, for example, a HTTP request (POST). In this process, the WebApi 26 of the information storing apparatus 10 stores the scan data received from the smartphone 11 in the folder that the user has selected in step S123.

In the sequence diagram of FIG. 23, data obtained from scan carried out by the MFP 13A is stored in the information storing apparatus 10 through the smartphone 11. However, it is also possible that, data obtained from scan carried out by the MFP 13A is stored in the smartphone 11.

Third Embodiment

The service providing system 1 according to the third embodiment has the same system configuration, hardware configuration and software configuration as those of the service providing system 1 according to the first embodiment described above. Thus, the description of the system configuration, hardware configuration and software configuration will be omitted.

<Details of Processing>

Below, details of processing of the service providing system 1 according to the third embodiment will be described.

Figure 24:
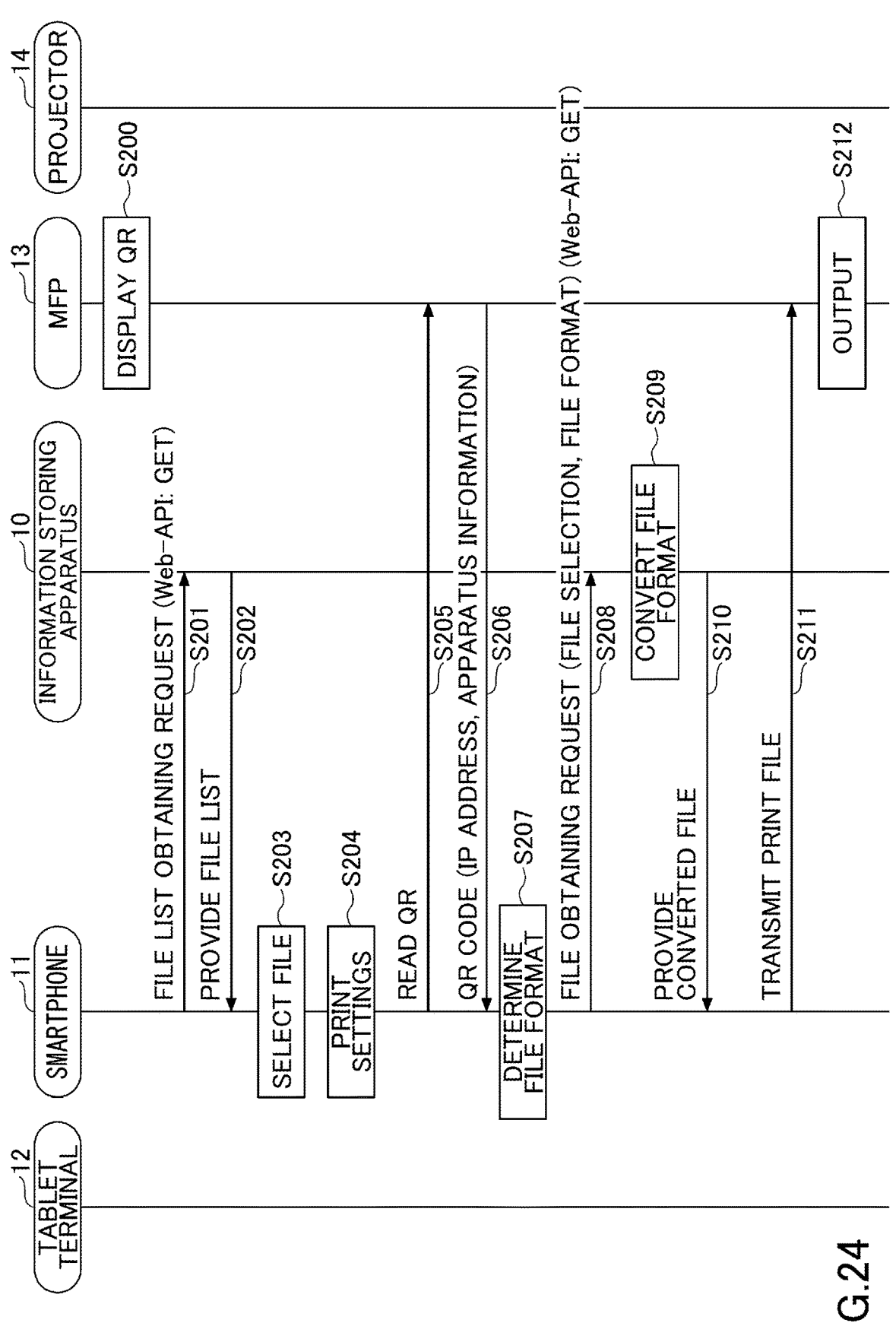
FIG. 24 is a sequence diagram of one example showing a procedure of the service providing system according to the third embodiment.

Here, processing will be described for a case where, using the smartphone 11, a file that the information storing apparatus 10 has is printed by the MFP 13. FIG. 24 is a sequence diagram of one example showing a procedure of the service providing system 1 according to the third embodiment. It is noted that processes of steps S200, S201 and S202 are the same as those of steps S0, S1 and S2 of FIG. 4, and the duplicate description will be omitted.

Figure 25:
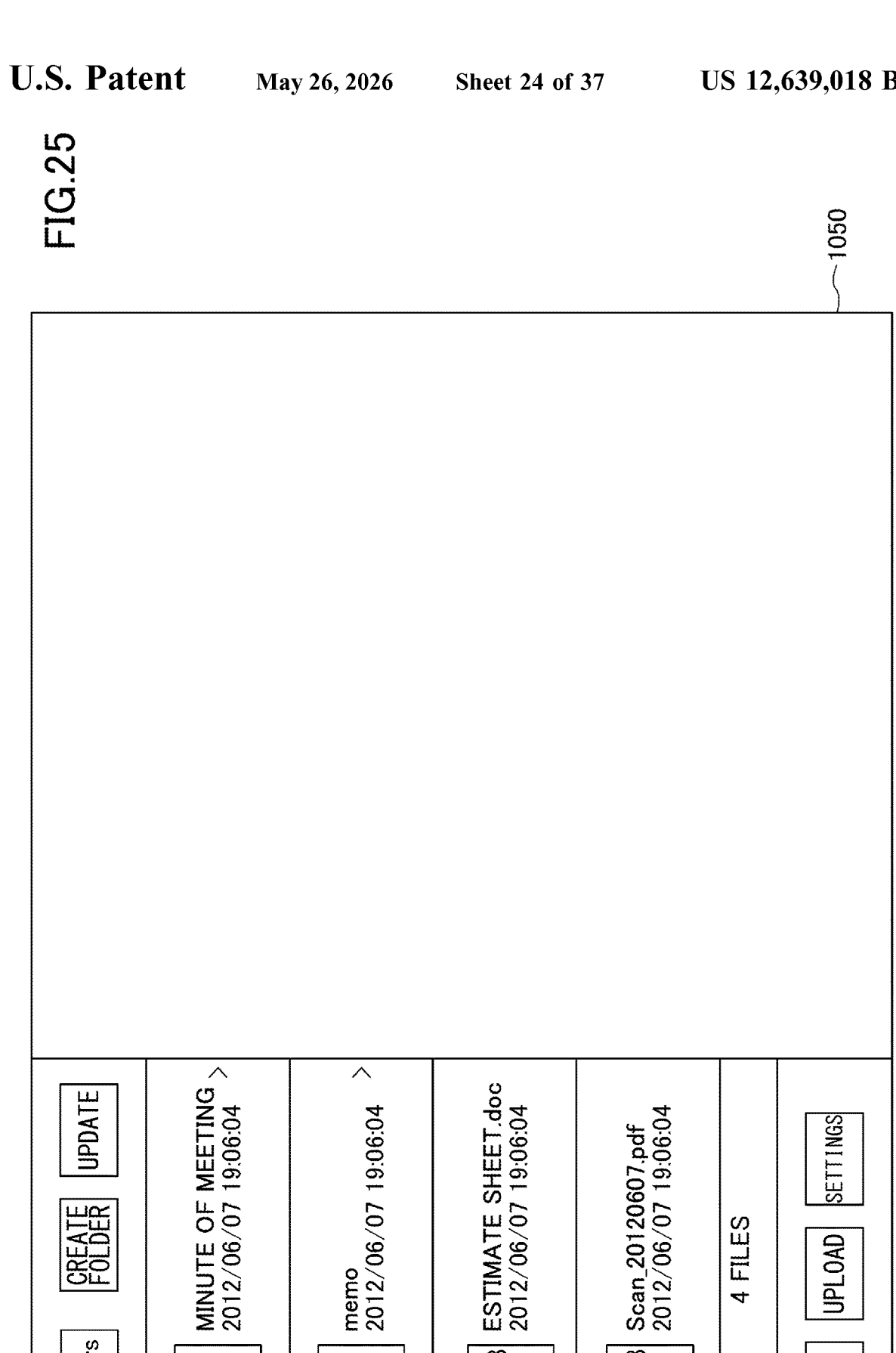
FIG. 25 is an image diagram of one example of a file list display screen page.
Figure 26:
FIG. 26 is an image diagram of one example of a file detail display screen page.

By repeating the processes of steps S201 and S202, the smartphone 11 displays screen pages such as those shown in FIGS. 6 and 7 and screen pages shown in FIGS. 25 and 26.

FIG. 25 is an image diagram of one example of a file list display screen page. The file list display screen page 1050 of FIG. 25 is a screen page example displayed after the "data" folder has been selected from the folder display selection screen page 1010 of FIG. 7. On the file list display screen page 1050 of FIG. 25, "Estimate Sheet.doc" and "Scan_20120607.pdf" are displayed as files.

FIG. 26 is an image diagram of one example of a file detail display screen page. The file detail display screen page 1060 of FIG. 26 is a screen page example displayed after the "Estimate Sheet.doc" file has been selected from the file list display screen page 1050 of FIG. 25. On the file detail display screen page 1060 of FIG. 26, an image 1063 of the "Estimate Sheet.doc" file thus selected from the file list display screen page 1050 is displayed.

Figure 27:
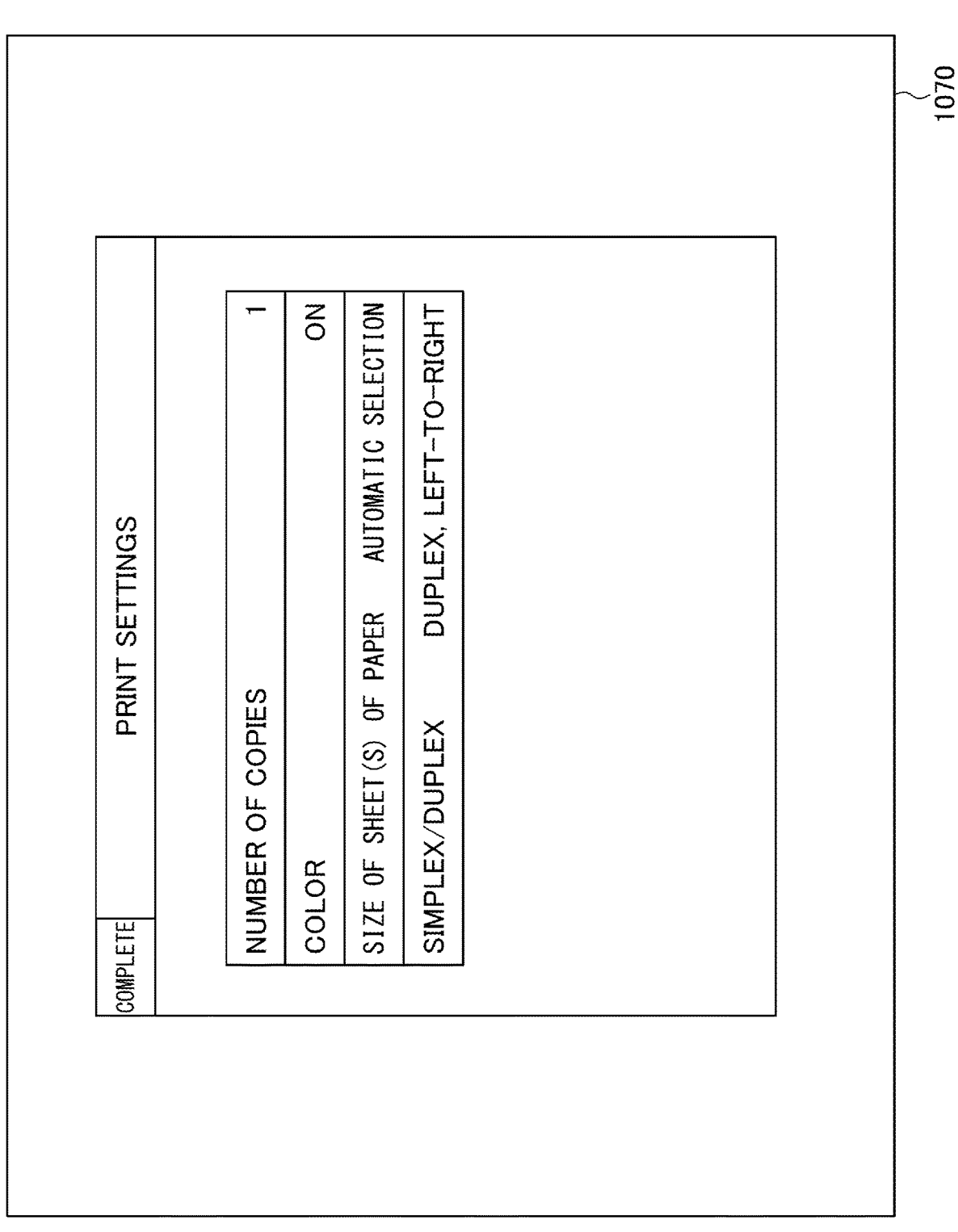
FIG. 27 is an image diagram of one example of a print setting screen page.

Then, in step S203 of FIG. 24, the user operates the smartphone 11 and selects a file to be printed by the MFP 13 from among the files shown in FIG. 25 or FIG. 26. Then, when a "print settings" 1061 button has been pressed on the file detail display screen page 1060 of FIG. 26, the smartphone 11 displays a print setting screen page 1070 shown in FIG. 27 in step S204. FIG. 27 is an image diagram of one example of the print setting screen page 1070. The user then operates the smartphone 11 and carries out settings for print to be carried out by the MFP 13 via the displayed print setting screen page 1070 of FIG. 27.

Figure 28:
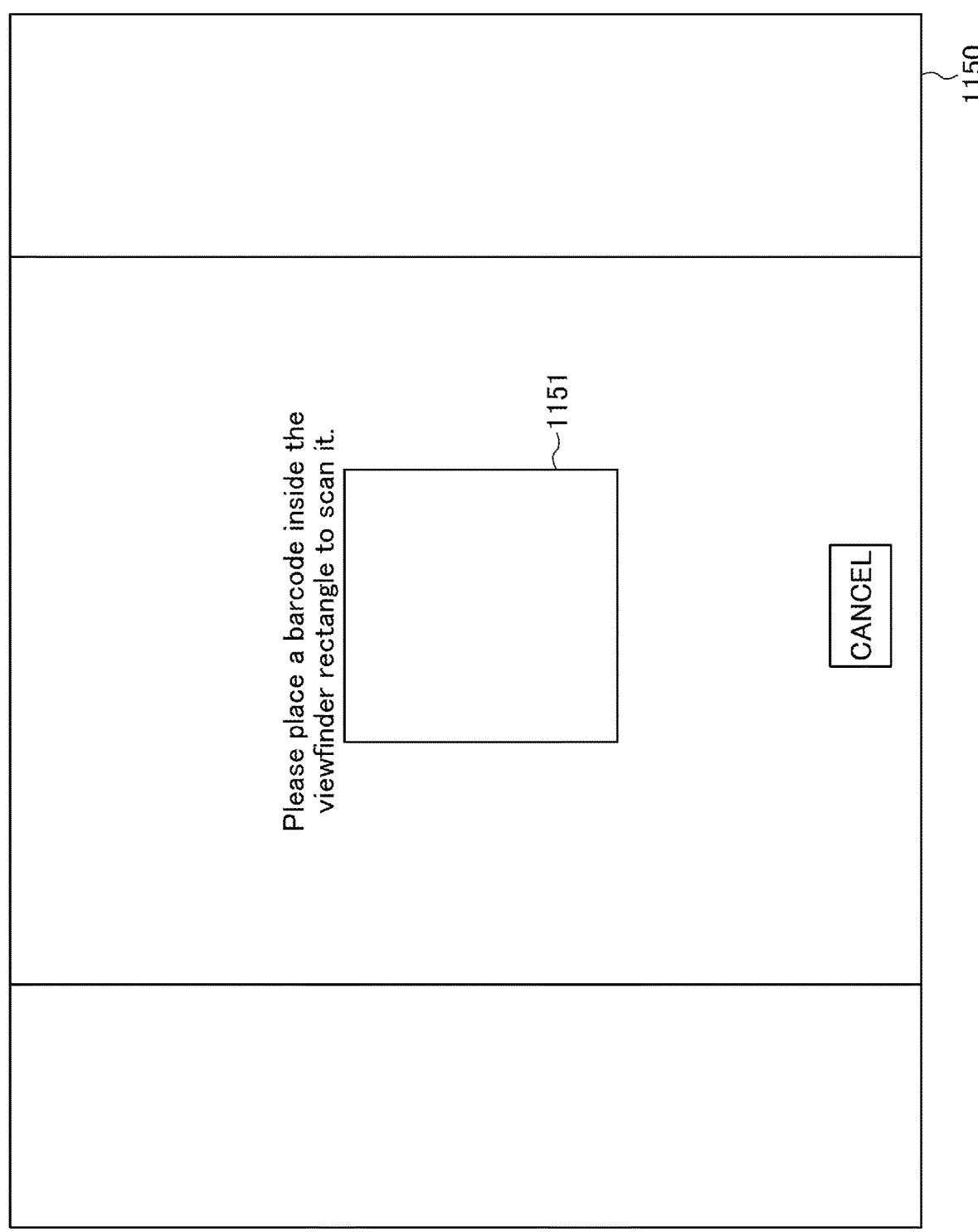
FIG. 28 is an image diagram of one example of a QR code reading screen page.

After selecting a file to be printed by the MFP 13 from the files shown in FIG. 25 or 26, the user can press a "QR" button 1062 on the file detail display screen page 1060 of FIG. 26. Thus, the user can cause a QR code reading screen page 1150, shown in FIG. 28, for example, to be displayed on the smartphone 11. FIG. 28 is an image diagram of one example of the QR code reading screen page 1150 displayed on the smartphone 11. The QR code reading screen page 1150 includes a QR code display area 1151. The QR code display area 1151 is an area in which an image taken by the camera function of the smartphone 11 will be displayed.

In steps S205 and S206 of FIG. 24, the user operates the smartphone 11, and adjusts a positional relationship between the QR code displayed on the MFP 13 (step S200) and the smartphone 11 so that the QR code, an image of which has been taken by the camera function of the smartphone 11, will be displayed in the QR code display area 1151 of the QR code reading screen page 1150 displayed on the smartphone 11.

The application of the smartphone 11 reads, from the QR code, an image of which has been taken by the camera function, the IP address of the MFP 13 and the function information indicating the scan function and the print function that the MFP 13 provides, as shown in FIG. 12.

Figure 29:
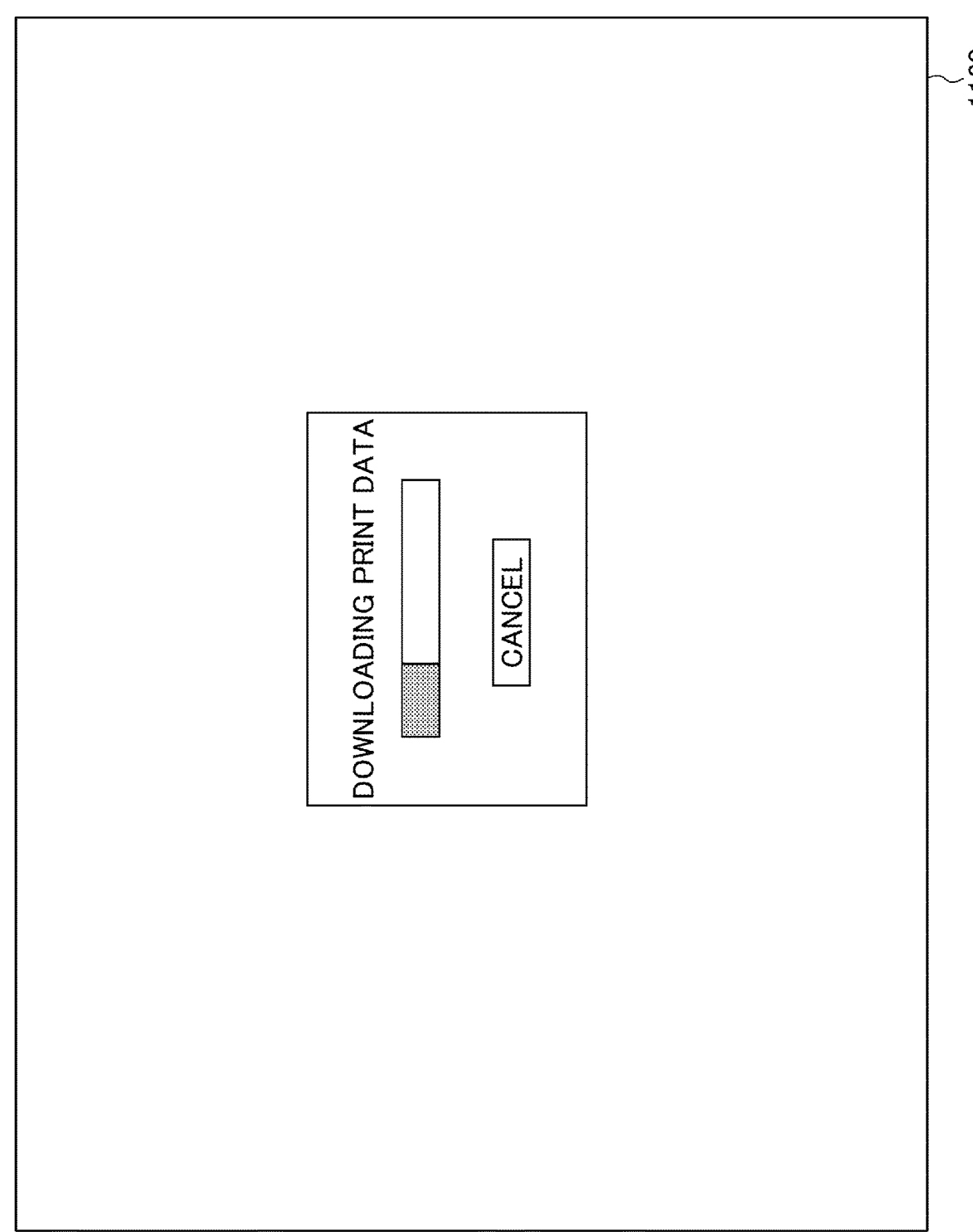
FIG. 29 is an image diagram of one example of a screen page indicating that downloading is being carried out.

After thus reading the IP address and the function information indicating the scan function and the print function of the MFP 13 from the QR code, an image of which has been taken by the camera function, the application of the smartphone 11 displays to the user a screen page 1160 indicating that downloading is being carried out, as shown in FIG. 29. FIG. 29 is an image diagram of one example of the screen page 1160 indicating that downloading of a print file is being carried out. The screen page 1160 of FIG. 29 may be continuously displayed by the smartphone 11 until step S211 described later is completed.

It is noted that, timing of displaying the QR code on the MFP 13, timing of providing the file list from the information storing apparatus 10 to the smartphone 11 and timing of reading information from the QR code displayed on the MFP 13 by the smartphone 11 are not limited to the order shown in the sequence diagram of FIG. 24.

In step S207, the application of the smartphone 11 determines a file format as described later depending on the function information that the application of the smartphone 11 has read information from the QR code. For example, when the function information includes the print function, the application of the smartphone 11 determines the file format as RPCS, PDL or the like which can be printed by the MFP 13.

In step S208, the application of the smartphone 11 sends a file obtaining request to the information storing apparatus 10. The file obtaining request includes information of the file selection and information of the file format determined in step S207.

In Step S209, the WebApi 26 of the information storing apparatus 10 receives the file obtaining request and sends a corresponding file obtaining request to the Web control part 29. The Web control part 29 obtains the corresponding file from the shared folder 27 based on the "information of the file selection" included in the file obtaining request thus received from the WebApi 26.

Further, the Web control part 29 determines, based on the "information of the file format" included in the file obtaining request from the WebApi 26, whether it is necessary to convert the file format of the file thus obtained from the shared folder 27. For example, when the file format of the file obtained from the shared folder 27 and the file format indicated by the "information of the file format" obtained from the WebApi 26 are the same, the Web control part 29 determines that conversion of the file format of the file obtained from the shared folder 27 is not necessary.

On the other hand, when the file format of the file obtained from the shared folder 27 and the file format indicated by the "information of the file format" obtained from the WebApi 26 are different from one another, the Web control part 29 determines that conversion of the file format of the file obtained from the shared folder 27 is necessary. When having determined that it is necessary to convert the file format, the Web control part 29 causes the document management part 28 to convert the file format into the file format indicated by the "information of the file format" accordingly. Below, a case where the Web control part 29 has determined that it is necessary to convert the file format will be described. The Web control part 29 then returns the converted file, the file format of which has been thus converted, to the WebApi 26.

In step S210, the WebApi 26 provides the converted file to the smartphone 11 via a HTTP response. In step S211, the application of the smartphone 11 transmits the converted file to the MFP 13 as a print file.

A specific method of thus transmitting a print file to the MFP 13 is, for example, a method of transmitting using a socket communication to the port of the number 9100 ("port 9100") of the MFP 13, as shown in FIG. 30. FIG. 30 illustrates one example of a method of transmitting a print file to the MFP 13. When having received the print file, the MFP 13 carries out print (output) based on the print file, in step S212.

FIG. 31 is a configuration diagram of one example of print commands included in a print file mentioned above. The print commands of FIG. 31 include the contents of print settings that have been set via the print setting screen page 1070 of FIG. 27 (#2 in FIG. 31) and the file name of a file to be printed (#1 in FIG. 31).

Figure 32:
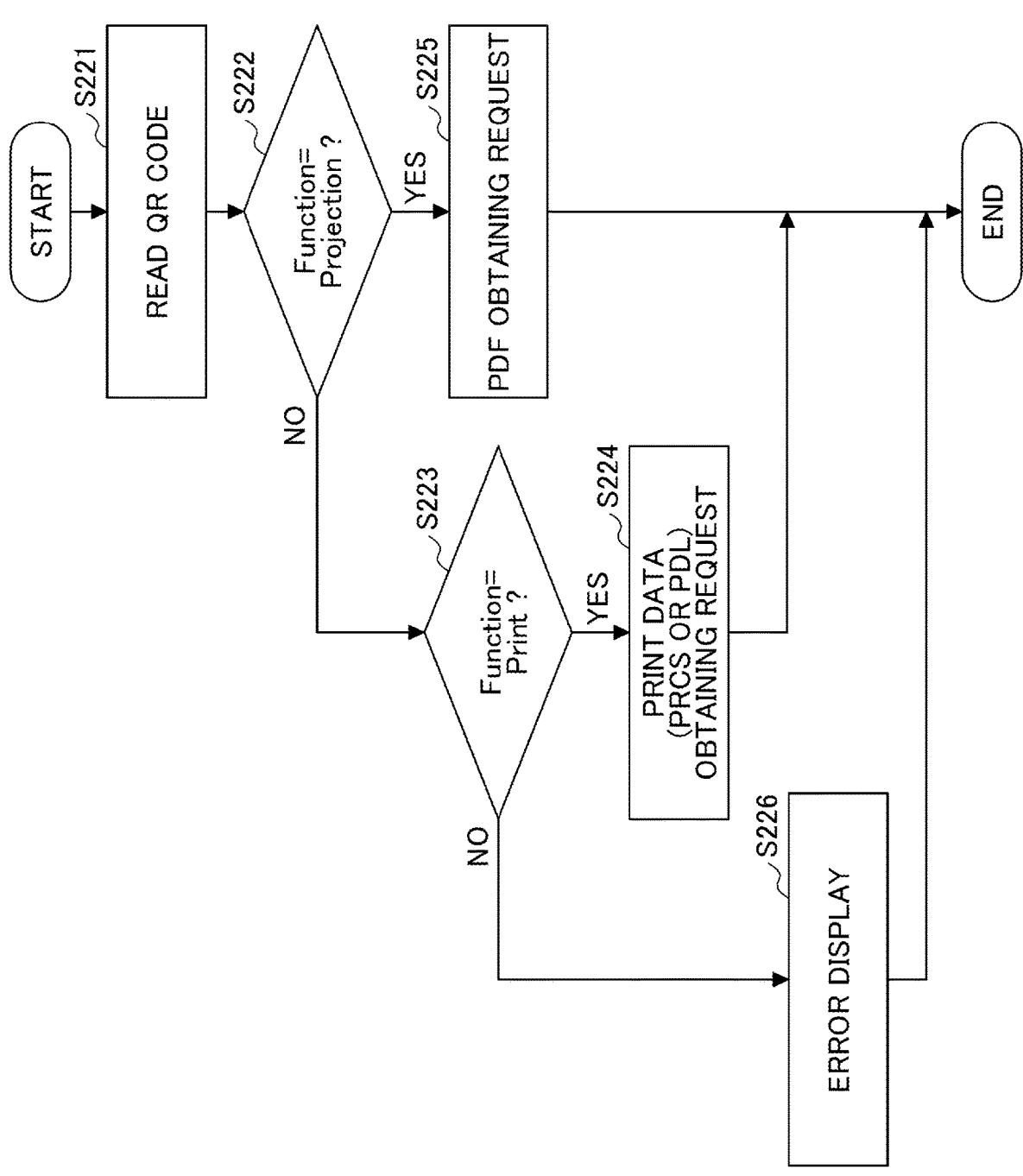
FIG. 32 is a flowchart of one example showing a procedure of a smartphone.

FIG. 32 is a flowchart of one example of a procedure of the smartphone 11. It is noted that the flowchart of FIG. 32 shows the procedure to be carried out after the QR code reading screen page 1150 shown in FIG. 28 has been displayed on the smartphone 11 as mentioned above.

In step S221 of FIG. 32, the application of the smartphone 11 reads the set value of item "Function" shown in FIG. 12 from the QR code, an image of which has been taken by the camera function of the smartphone 11.

In step S222, the application of the smartphone 11 determines whether the set value of item "Function" is "Projection" that indicates the projection function (projector 14). When the set value of item "Function" is "Projection" that indicates the projection function (projector 14), the application of the smartphone 11 proceeds to step S225, and sends a file obtaining request, which designates, as a file format, "PDF" that can be projected by the projector 14, to the information storing apparatus 10.

When the set value of item "Function" is not "Projection" that indicates the projection function (projector 14), the application of the smartphone 11 proceeds to step S223, and determines whether the set value of item "Function" is "Print" that indicates the print function (MFP 13). When the set value of item "Function" is "Print" that indicates the print function (MFP 13), the application of the smartphone 11 proceeds to step S224, and sends a file obtaining request, which designates, as a file format, RPCS or PDL that can be printed by the MFP 13, to the information storing apparatus 10.

When the set value of item "Function" is not "Print" that indicates the print function (MFP 13) in step S223, the application of the smartphone 11 proceeds to step S226, and carries out an error display process since it is not possible to determine a file format that the file obtaining request is to designate.

According to the sequence diagram of FIG. 24, it is possible to display, on the smartphone 11, the files placed in the shared folder 27 of the information storing apparatus 10, by installing the WebApi 26 in the information storing apparatus 10. A user can obtain from the information storing apparatus 10 a converted file of a file format that can be printed by the MFP 13, by selecting the file via the smartphone 11 and reading via the smartphone 11 information from the QR code 1201 of the MFP 13 that the user wishes to use to print the file. The smartphone 11 can cause the MFP 13 to print the converted file thus obtained from the information storing apparatus 10, by transmitting the converted file to the MFP 13 as a print file.

Thus, a user can cause the information storing apparatus 10, the smartphone 11 and the MFP 13 to operate in cooperation with each other, by holding the smartphone 11 against the MFP 13 at a time of starting print (to cause the smartphone 11 to read information from the QR code of the MFP 13), and thus, the user can easily cause the MFP 13 to print a file placed in the shared folder 27 of the information storing apparatus 10.

The sequence diagram of FIG. 24 shows the process of obtaining a file from the information storing apparatus 10 using the smartphone 11, and printing the file using the MFP 13. The service providing system 1 according to the third embodiment can also be used, as shown in FIG. 33, to obtain a file from the information storing apparatus 10 using the smartphone 11, and project the file using the projector 14.

Figure 33:
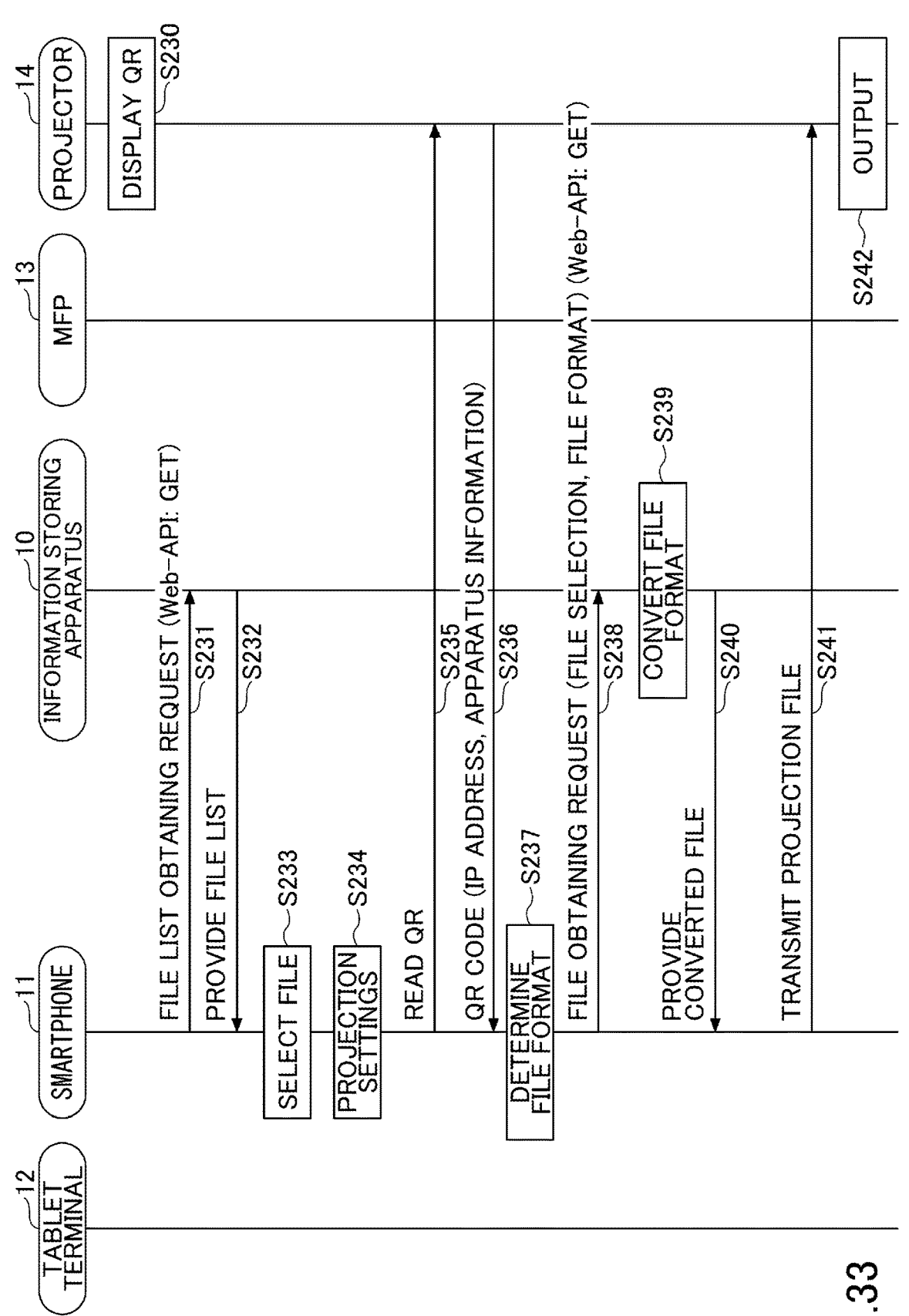
FIG. 33 is a sequence diagram of another example showing a procedure of the service providing system according to the third embodiment.

FIG. 33 is a sequence diagram of another example showing a procedure of the service providing system 1 according to the third embodiment. It is noted that the processes of steps S230, S231, S232 and S233 of FIG. 33 are the same as those of steps S200, S201, S202 and S203 of FIG. 24, and thus, duplicate description will be omitted.

When a "projection settings" button (not shown) has been pressed on the file detail display screen page 1060, the smartphone 11 displays a projection setting screen page in step S234.

The user then operates the smartphone 11 and carries out settings for projection to be carried out by the projector 14 via the displayed projection setting screen page.

After selecting a file to be projected by the projector 14 from the files shown in FIG. 25 or 26, the user presses the "QR" button 1062 on the file detail display screen page 1060. Thereby, the user can cause the QR code reading screen page 1150, as shown in FIG. 28, for example, to be displayed on the smartphone 11.

Figure 36:
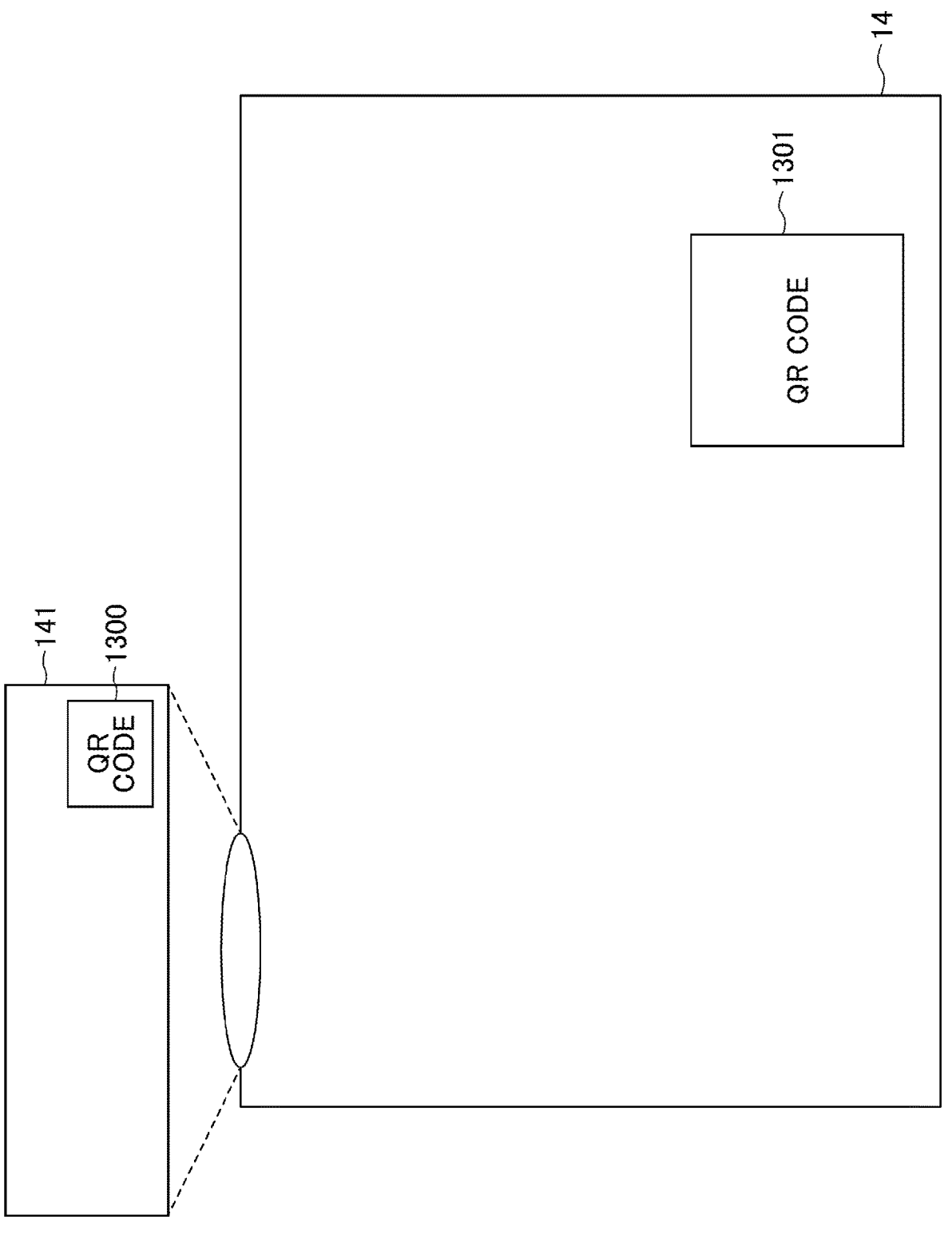
FIG. 36 is an image diagram of one example of a QR code displayed by the projector.

In steps S235 and S236, the user operates the smartphone 11, and adjusts a positional relationship between the QR code displayed by the projector 14 (step S230) (onto a projection screen 141 or the like as shown in FIG. 36 described later) and the smartphone 11 so that the QR code, an image of which has been taken by the camera function of the smartphone 11, will be displayed in the QR code display area 1151 of the QR code reading screen page 1150 displayed on the smartphone 11.

The application of the smartphone 11 reads, from the QR code, an image of which has been taken by the camera function of the smartphone 11, the IP address of the projector 14, a projector name, the function information indicating the projection function that the projector 14 provides, and a type of the projector 14, as shown in FIG. 34. FIG. 34 is a configuration diagram of one example of the information that the application of the smartphone 11 reads from the QR code.

After thus reading the IP address and the function information indicating the projection function of the projector 14 from the QR code, the application of the smartphone 11 displays the screen page indicating that downloading is being carried out to the user, as shown in FIG. 29, for example.

It is noted that, timing of displaying the QR code by the projector 14, timing of providing the file list from the information storing apparatus 10 to the smartphone 11, and timing of reading information by the smartphone 11 from the QR code displayed by the projector 14 are not limited to the order shown in the sequence diagram of FIG. 33.

In step S237, the application of the smartphone 11 determines, as shown in FIG. 32, a file format, depending on the function information that the application of the smartphone

11 has read from the QR code. For example, when the function information includes the projection function, the application of the smartphone 11 determines the file format as PDF or the like which can be projected by the projector 14.

The processes of steps S238, S239 and S240 are the same as those of steps S208, S209 and S210 of FIG. 24, and thus, duplicate description will be omitted. In step S241, the application of the smartphone 11 transmits the converted file to the projector 14 as a projection file. A specific method of transmitting a projection file is, for example, a method of transmitting it using a WebApi that is published by the projector 14, as shown in FIG. 35. FIG. 35 illustrates one example of a method of transmitting a projection file to the projector 14. When having received the projection file, the projector 14 carries out projection (output) based on the projection file, in step S242.

Further, in order to display the QR code, the projector 14 can project a screen page including the QR code 1300 as shown in FIG. 36 on the projection screen 141 or the like, or it is also possible to affix a seal of the QR code 1301 onto the housing of the projector 14, for example. FIG. 36 is an image diagram of one example of a QR code displayed by the projector 14. For example, the projector 14 can thus project the QR code 1300 by displaying, using a Web browser (not shown), the QR code display Web UI 25 of the information storing apparatus 10. Further, it is possible that the projector 14 stores image data of the QR code 1300 in the projector 14 itself, or obtains image data of the QR code 1300 from the outside.

Other than affixing a seal of the QR code 1301 on the housing of the projector 14, it is also possible to affix a seal of the QR code 1301 on, for example, a wall of a room in which the projector 14 is installed. In other words, a specific position to affix a seal of the QR code 1301 is preferably a position such that a user can understand that the QR code 1301 is one that is associated with the projector 14.

In the sequence diagram of FIG. 24, the processes have been shown for a case of obtaining a file from the information storing apparatus 10 using the smartphone 11 and printing the file using the MFP 13. However, the service providing system 1 according to the third embodiment can also be used for a case of, as shown in a sequence diagram of FIG. 37, using the tablet terminal 12 to obtain a file from the information storing apparatus 10 and print the file using the MFP 13.

Figure 37:
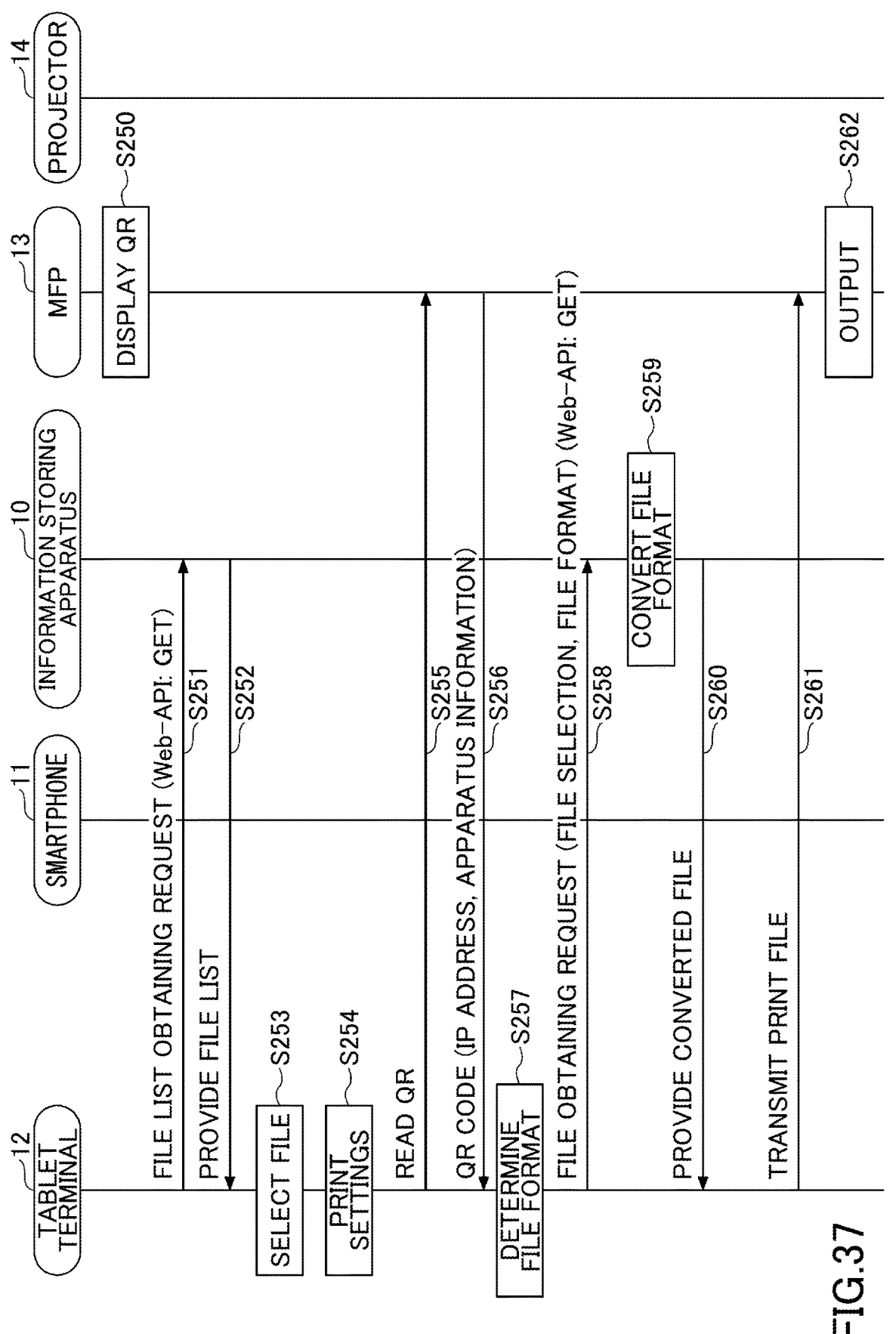
FIG. 37 is a sequence diagram of yet another example showing a procedure of the service providing system according to the third embodiment.

FIG. 37 is a sequence diagram of yet another example of a procedure of the service providing system 1 according to the third embodiment. Since processes of step S250 and steps from S251 to S262 in the sequence diagram of FIG. 37 are the same as those of step S200 and steps from S201 to S212 of FIG. 24 except that the role of the smartphone 11 in the procedure of FIG. 24 is replaced by the tablet terminal 12 in the procedure of FIG. 37, duplicate description will be omitted.

Further, in the sequence diagram of FIG. 33, the processes have been shown for a case of using the smartphone 11 to obtain a file from the information storing apparatus 10 and project the file using the projector 14. However, the service providing system 1 according to the third embodiment can also be used for a case of, using the tablet terminal 12 in the same manner as the case of FIG. 37 to obtain a file from the information storing apparatus 10 and project the file using the projector 14.

Fourth Embodiment

A service providing system 1 according to the fourth embodiment has the same system configuration, hardware configuration and software configuration as those of the service providing system 1 according to the first embodiment described above. Thus, the description of the system configuration, hardware configuration and software configuration will be omitted.

<Details of Processing>

Below, processing of the service providing system 1 according to the fourth embodiment will be described in detail.

Figure 38:
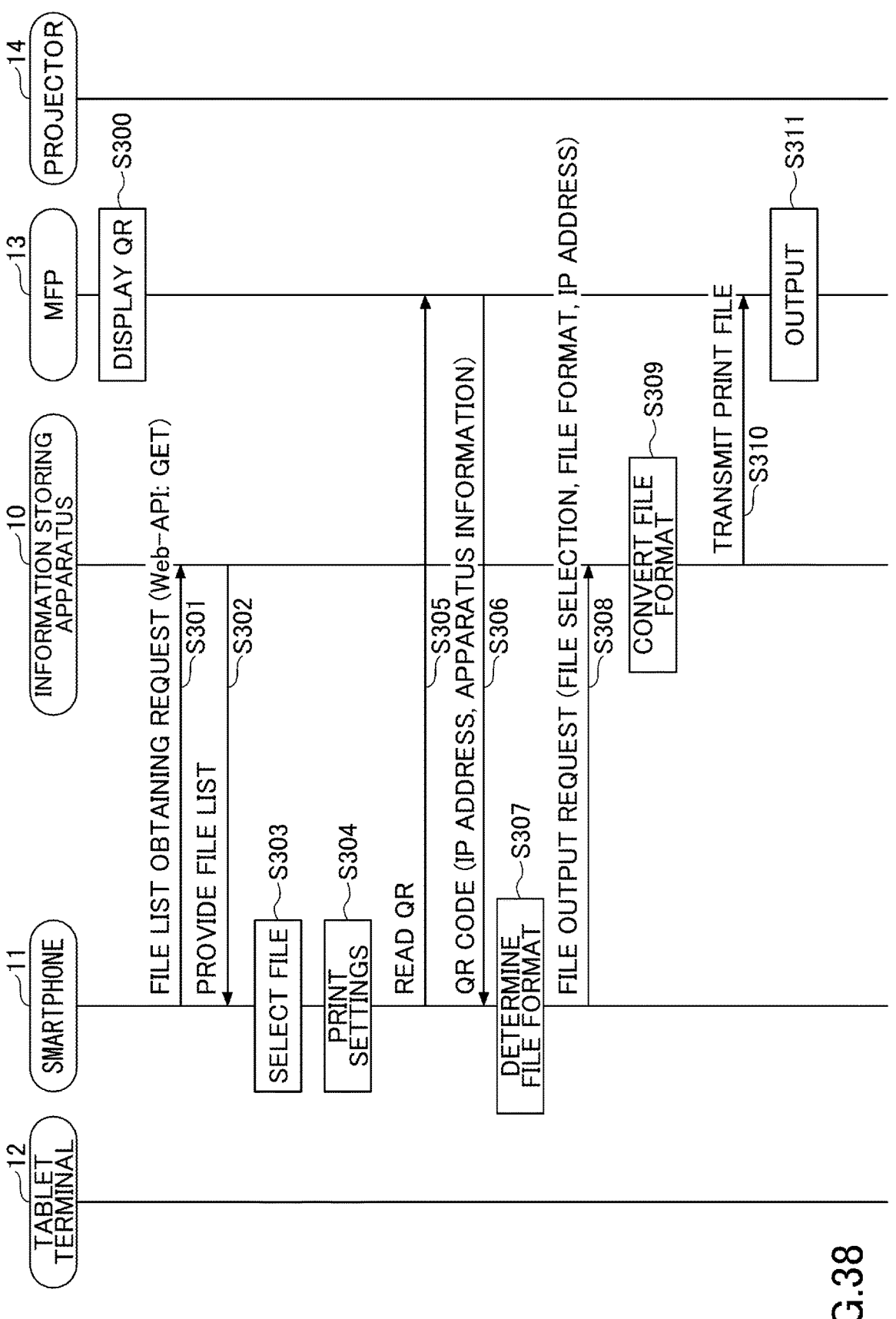
FIG. 38 is a sequence diagram of one example showing a procedure of a service providing system according to a fourth embodiment.

Here, processes will now be described for a case of using the smartphone 11 and causing the MFP 13 to print a file that the information storing apparatus 10 stores therein. FIG. 38 is a sequence diagram showing one example of a procedure of the service providing system 1 according to the fourth embodiment. Processes of step S300 and steps from S301 to S307 of FIG. 38 are the same as those of step S200 and steps from S201 to S207 of FIG. 24, and thus, the duplicate description therefor will be omitted.

In step S308, the application of the smartphone 11 sends a file output request to the information storing apparatus 10. The file output request includes information of the file selection, information of the file format determined in step S307 and the IP address of the MFP 13.

In Step S309, the WebApi 26 of the information storing apparatus 10 then receives the file output request and sends a corresponding file output request to the Web control part 29. The Web control part 29 then obtains the file from the shared folder 27 based on the "information of the file selection" included in the file output request thus received from the WebApi 26.

Further, the Web control part 29 determines, based on the "information of the file format" included in the file output request from the WebApi 26, whether it is necessary to convert the file format of the file thus obtained from the shared folder 27. For example, when the file format of the file obtained from the shared folder 27 and the file format indicated by the "information of the file format" obtained from the WebApi 26 are the same, the Web control part 29 determines that conversion of the file format of the file obtained from the shared folder 27 is not necessary.

On the other hand, when the file format of the file obtained from the shared folder 27 and the file format indicated by the "information of the file format" obtained from the WebApi 26 are different from one another, the Web control part 29 determines that conversion of the file format of the file obtained from the shared folder 27 is necessary. When having determined that it is necessary to convert the file format, the Web control part 29 causes the document management part 28 to convert the file format into the file format indicated by the "information of the file format". Below, a case where the Web control part 29 has determined that it is necessary to convert the file format will be described. The Web control part 29 then returns the converted file, the file format of which has been thus converted, to the WebApi 26.

In step S310, the WebApi 26 transmits the converted file to the MFP 13 as a print file. A specific method of thus transmitting the print file to the MFP 13 is, for example, a method of transmitting it using a socket communication to the port of the number 9100 ("port 9100") of the MFP 13, as shown in FIG. 30. When having received the print file, the MFP 13 carries out print (output) based on the print file, in step S311.

According to the sequence diagram of FIG. 38, it is possible to display on the smartphone 11 the files placed in the shared folder 27 of the information storing apparatus 10, by installing the WebApi 26 in the information storing apparatus 10. Also, it is possible that a file format that can be printed by the MFP 13 is designated and a file is printed by the MFP 13, as a result of the user selecting the file from those displayed on the smartphone 11 and causing the smartphone 11 to read information from the QR code 1201 of the MFP 13 that the user wishes to use to print the file.

Thus, by holding the smartphone 11 against the MFP 13 at a time of starting print (to cause the smartphone 11 to read information from the QR code of the MFP 13), a user can cause the information storing apparatus 10, the smartphone 11 and the MFP 13 to operate in cooperation with each other, and can easily cause the MFP 13 to print a file placed in the shared folder 27 of the information storing apparatus 10.

The sequence diagram of FIG. 38 shows the processes of using the smartphone 11 to cause a file to be transmitted from the information storing apparatus 10 to the MFP 13 and printed by the MFP 13. The service providing system 1 according to the fourth embodiment can also be used, as shown in the sequence diagram of FIG. 39, to use the smartphone 11 to cause a file to be transmitted from the information storing apparatus 10 to the projector 14 and projected by the projector 14.

Figure 39:
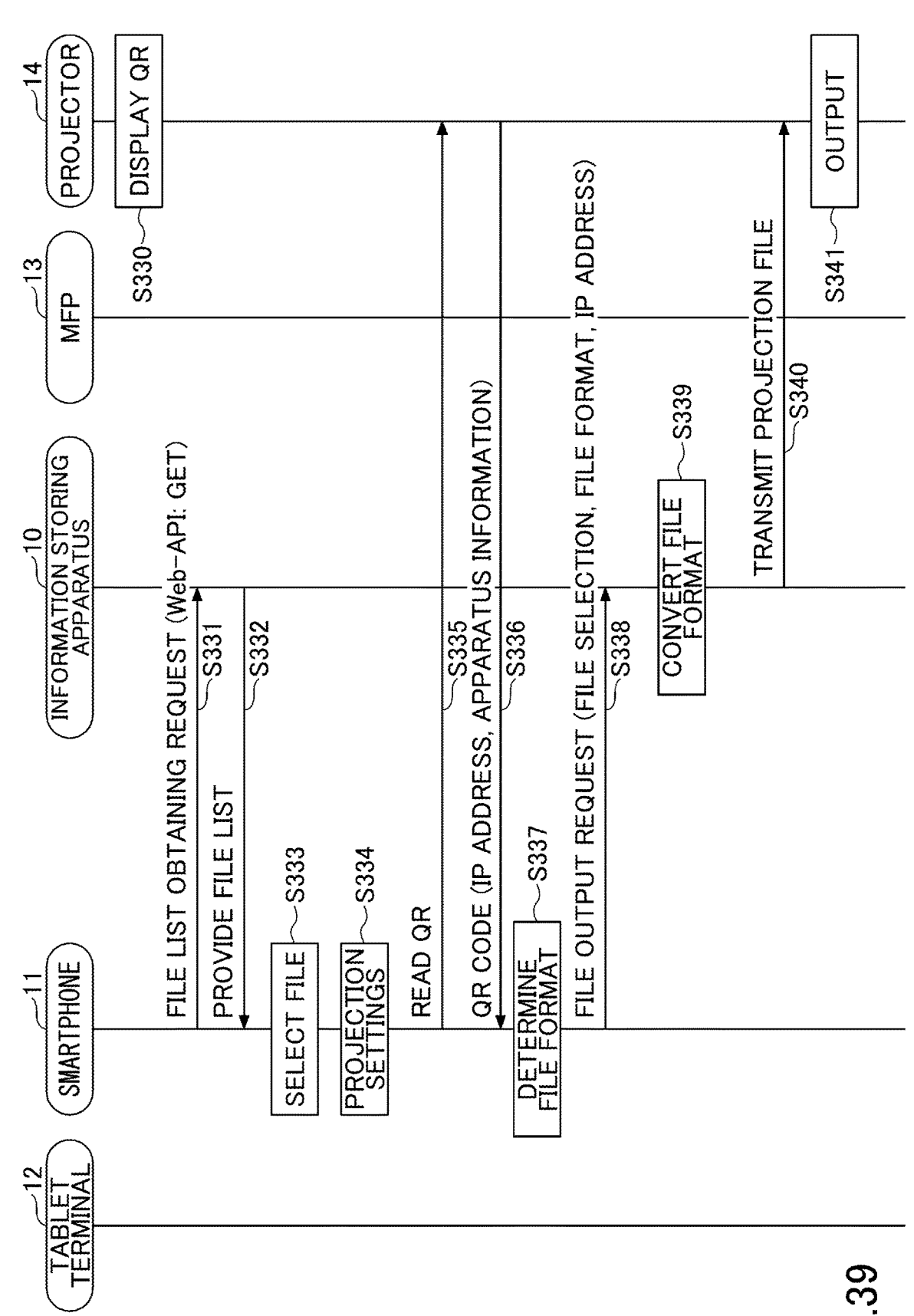
FIG. 39 is a sequence diagram of another example showing a procedure of the service providing system according to the fourth embodiment.

FIG. 39 is the sequence diagram of another example showing a procedure of the service providing system according to the fourth embodiment. It is noted that the processes of steps S330, S331, S332 and S333 are the same as those of steps S300, S301, S302 and S303 of FIG. 38, and thus, duplicate description will be omitted.

When a "projection settings" button (not shown) on the file detail display screen page 1060 has been pressed, the smartphone 11 displays the projection setting screen page in step S334. The user then operates the smartphone 11 and carries out settings for projection to be carried out by the projector 14 via the thus displayed projection setting screen page.

After selecting a file to be projected by the projector 14 from files shown in FIG. 25 or 26, the user presses the "QR" button 1062 on the file detail display screen page 1060. Thereby, the user can cause the smartphone 11 to display the QR code reading screen page 1150 as shown in FIG. 28, for example.

In steps S335 and S336, the user operates the smartphone 11 to adjust a positional relationship between the QR code displayed by the projector 14 (onto the projection screen 141 or the like) and the smartphone 11 so that the QR code, an image of which has been taken by the camera function of the smartphone 11, will be displayed in the QR code display area 1151 of the QR code reading screen page 1150 displayed on the smartphone 11.

The application of the smartphone 11 reads, from the QR code, an image of which has been taken by the camera function, the IP address of the projector 14, the projector name, the function information indicating the projection function that the projector 14 provides, and the type of the projector 14, as shown in FIG. 34.

It is noted that, timing of displaying the QR code by the projector 14, timing of providing the file list from the information storing apparatus 10 to the smartphone 11 and timing of reading information by the smartphone 11 from the QR code displayed by the projector 14 are not limited to the order shown in the sequence diagram of FIG. 39.

In step S337, the application of the smartphone 11 determines, as shown in FIG. 32, a file format, depending on the function information that the application of the smartphone 11 has read from the QR code. For example, when the function information includes the projection function, the application of the smartphone 11 determines the file format as PDF or the like which can be projected by the projector 14.

In step S338, the application of the smartphone 11 sends a file output request to the information storing apparatus 10. The file output request includes information of the file selection, information of the file format determined in step S337 and the IP address of the projector 14.

In Step S339, the WebApi 26 of the information storing apparatus 10 then receives the file output request and sends a corresponding file output request to the Web control part 29. The Web control part 29 obtains the file from the shared folder 27 based on the "information of the file selection" included in the file output request thus received from the WebApi 26.

Further, the Web control part 29 determines, based on the "information of the file format" included in the file output request from the WebApi 26, whether it is necessary to convert the file format of the file thus obtained from the shared folder 27. For example, when the file format of the file obtained from the shared folder 27 and the file format indicated by the "information of the file format" obtained from the WebApi 26 are the same, the Web control part 29 determines that conversion of the file format of the file obtained from the shared folder 27 is not necessary.

On the other hand, when the file format of the file obtained from the shared folder 27 and the file format indicated by the "information of the file format" obtained from the WebApi 26 are different from one another, the Web control part 29 determines that conversion of the file format of the file obtained from the shared folder 27 is necessary. When having determined that it is necessary to convert the file format, the Web control part 29 causes the document management part 28 to convert the file format into the file format indicated by the "information of the file format". Below, a case where the Web control part 29 has determined that it is necessary to convert the file format will be described. The Web control part 29 then returns the converted file, the file format of which has been thus converted, to the WebApi 26.

In step S340, the WebApi 26 transmits the converted file to the projector 14 as a projection file. A specific method of thus transmitting the projection file to the projector 14 is, for example, a method of transmitting it using a WebApi that is published by the projector 14, as shown in FIG. 35. When having received the projection file, the projector 14 carries out projection (output) based on the projection file, in step S341.

According to the sequence diagram of FIG. 39, it is possible to display, on the smartphone 11, the files placed in the shared folder 27 of the information storing apparatus 10, by installing the WebApi 26 in the information storing apparatus 10. Also, it is possible that a file format that can be projected by the projector 14 is designated and a file is projected by the projector 14, as a result of the user selecting the file from those displayed on the smartphone 11 and causing the smartphone 11 to read information from the QR code 1300, 1301 or the like of the projector 14 that the user wishes to use to project the file.

Thus, by holding the smartphone 11 against the projection screen 141 or the like of the projector 14 at a time of starting projection to cause the smartphone 11 to read information from the QR code displayed onto the projection screen 141 or the like by the projector 14, a user can cause the information storing apparatus 10, the smartphone 11 and the projector 14 to operate in cooperation with each other, and thus, the user can easily cause the projector 14 to project a file placed in the shared folder 27 of the information storing apparatus 10.

The sequence diagram of FIG. 38 shows the processes of using the smartphone 11 to cause a file to be transmitted from the information storing apparatus 10 to the MFP 13, and cause the MFP 13 to print the file. The service providing system 1 according to the fourth embodiment can also be used, as shown in the sequence diagram of FIG. 40, to use the tablet terminal 12 to cause a file to be transmitted from the information storing apparatus 10 to the MFP 13, and cause the MFP 13 to print the file.

Figure 40:
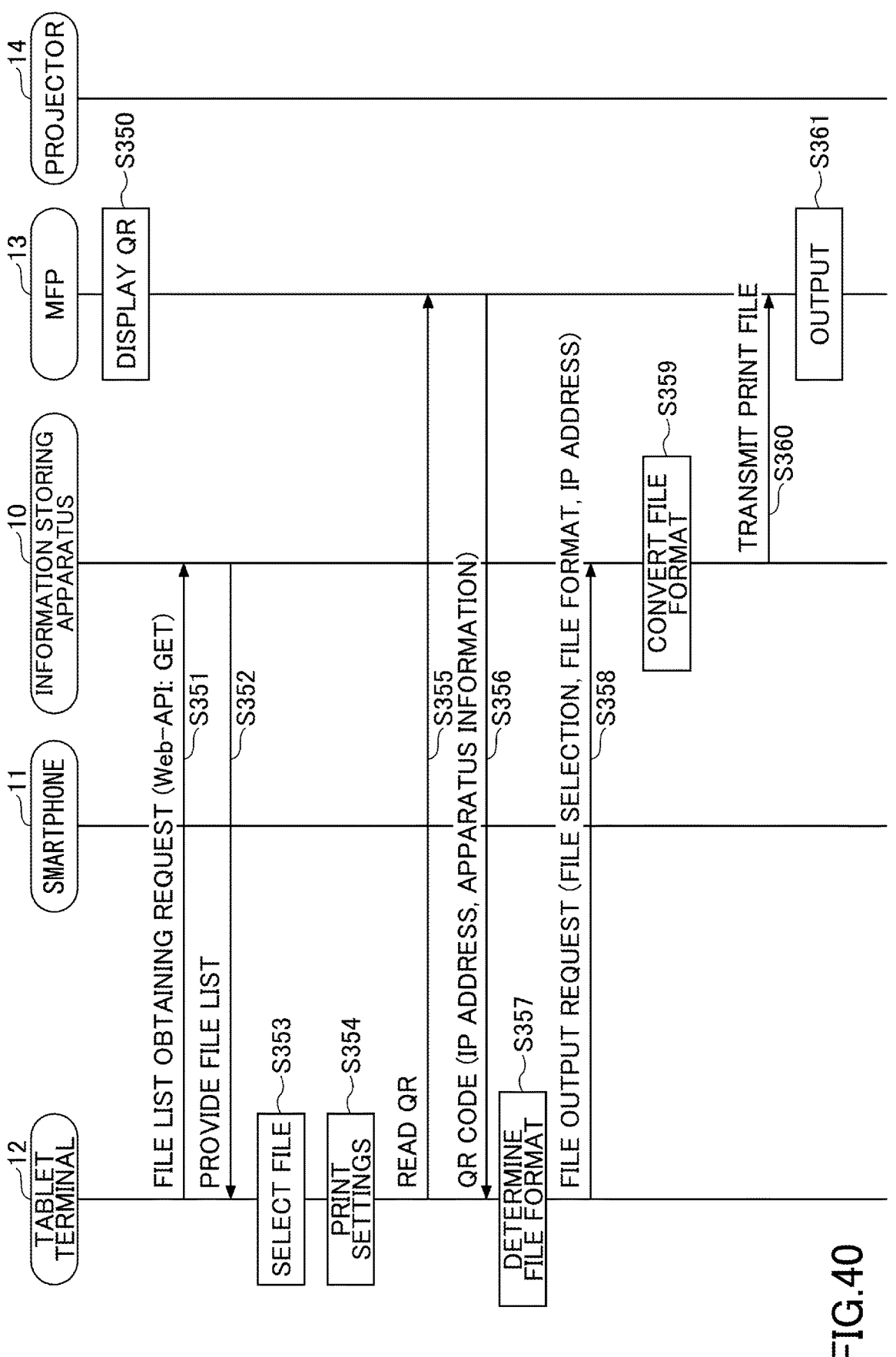
FIG. 40 is a sequence diagram of yet another example showing a procedure of the service providing system according to the fourth embodiment.

FIG. 40 is the sequence diagram of yet another example showing a procedure of the service providing system 1 according to the fourth embodiment. It is noted that the processes of step S350 and steps from S351 to S361 in the sequence diagram of FIG. 40 are the same as those of step S300 and steps from S301 to S311 of FIG. 38 except that the role of the smartphone 11 in the procedure of FIG. 38 is replaced by the tablet terminal 12 in the procedure of FIG. 40, and thus, duplicate description will be omitted.

Further, in the sequence diagram of FIG. 39, the processes have been shown for a case of using the smartphone 11 to cause a file to be transmitted from the information storing apparatus 10 to the projector 14 and cause the projector 14 to project the file. However, the service providing system 1 according to the fourth embodiment can also be used for a case of using the tablet terminal 12 in the same manner as FIG. 40 instead of the smartphone 11 to cause a file to be transmitted from the information storing apparatus 10 to the projector 14 and cause the projector 14 to project the file.

According to the sequence diagram of FIG. 40, it is possible to display, on the tablet terminal 12, the files placed in the shared folder 27 of the information storing apparatus 10, by installing the WebApi 26 in the information storing apparatus 10. Also, it is possible that a file format that can be printed by the MFP 13 is designated and a file is printed by the MFP 13, as a result of the user selecting the file from those displayed on the tablet terminal 12 and casing the tablet terminal 12 to read information from the QR code 1201 of the MFP 13 that the user wishes to use to print the file.

Thus, by holding the tablet terminal 12 against the MFP 13 at a time of starting print to cause the tablet terminal 12 to read information from the QR code displayed on the MFP 13, a user can cause the information storing apparatus 10, the tablet terminal 12 and the MFP 13 to operate in cooperation with each other, and thus, the user can easily cause the MFP 13 to print a file placed in the shared folder 27 of the information storing apparatus 10.

Further, also it is naturally possible to use a facsimile function that the MFP 13 has, and transmit data stored in the information storing apparatus 10 by fax. In this case, in step S204 of FIG. 24, facsimile transmission conditions are set instead of setting print conditions (print settings). The facsimile transmission conditions include, for example, whether to attach a letter of transmittal, a transmission result notification destination, whether to print date and time, transmission source information, transmission destination information and/or the like. Further, it is also possible to use, for the facsimile transmission conditions, information of another application that is installed and operates in the smartphone. For example, it is possible for a user to select a destination telephone number from among data that is managed by the other application prepared for managing addresses.

The information storing apparatus 10 generates facsimile transmission image data according to the received facsimile transmission conditions (facsimile transmission settings). It is noted that the information storing apparatus 10 can use facsimile transmission image data that is previously generated, or can generate facsimile transmission image data after receiving a facsimile transmission instruction from the smartphone 11.

The thus generated facsimile transmission image data is then transmitted to the MFP 13 from the information storing apparatus 10. The MFP 13 transmits the received facsimile transmission image data to the destination.

Further, in addition to displaying data stored in the information storing apparatus 10 on the smartphone 11, it is also possible that data stored in the information storing apparatus 10 is also stored in the smartphone 11.

SUMMARY OF EMBODIMENTS

Thus, according to the service providing systems 1 according to the embodiments, a user can obtain advantageous effects as follows. That is, by holding an information processing apparatus such as the smartphone 11 or the tablet terminal 12 against an electronic device such as the MFP 13 or the projector 14 and obtaining information for determining the electronic device such as a QR code, the user can cause a cooperative processing apparatus such as the information storing apparatus 10, the information processing apparatus and the electronic device to operate in cooperation with each other, and receive various services using the electronic device.

Further, the service providing systems 1 according to the embodiments can provide various services, as a result of an electronic device such as the MFP 13 or the projector 14, an information processing apparatus such as the smartphone 11 or the tablet terminal 12 and a cooperative processing apparatus such as the information storing apparatus operating in cooperation with each other by a cooperation method that is depending on the respective services such as print, projection and scan to be provided.

Further, a cooperation method concerning a new service to be provided by an electronic device such as the MFP 13, the projector 14 or another new electronic device can be previously defined in the service providing systems according to the embodiments. Thereby, it is possible to cause an electronic device such as the MFP 13, the projector 14 or another new apparatus, an information processing apparatus such as the smartphone 11 or the tablet terminal 12 and a cooperative processing apparatus such as the information storing apparatus to operate in cooperation with each other by the cooperation method that is depending on the new service. Thus, it is possible to provide the new service in addition to existing services.

Thus, according to systems including operation devices and information storing apparatuses, methods performed by the systems, and the information storing apparatuses of the embodiments, apparatuses included in the system operate in cooperation with each other to provide a service(s).

Although the systems including operation devices and information storing apparatuses, methods performed by the systems, and the information storing apparatuses have been described by the embodiments, the present invention is not limited to the specifically disclosed embodiments, and variations and modifications may be made without departing from the scope of the present invention.

The invention claimed is:

1. An operation device, comprising:

a processor; and a memory storing instructions, which when executed cause the processor to:

display a first screen (i) including a button to receive scanner setting information, and (ii) indicating an obtaining method, the obtaining method for obtaining identification information for connecting the operation device, via a communication method which is different than the obtaining method, to an electronic device;

receive the scanner setting information;

identify, after the scanner setting information is received, the electronic device by obtaining the identification information from the electronic device;

send a scan command to the electronic device corresponding to the identification information, to cause the electronic device to generate scanner data based on the scanner setting information and to send the scanner data to the operation device;

receive the scanner data sent from the electronic device;

receive printer setting information;

display data obtained from a server, the data including attribute information of printable file data;

receive, at the operation device, a selection of the attribute information which is within the data;

obtain, from the server, the printable file data corresponding to the attribute information which was selected;

display a second screen (i) including a preview image of the printable file data, the preview image corresponding to an image contained within the printable file data, and (ii) indicating the obtaining method, the obtaining method for obtaining the identification information for connecting the operation device, via the communication method which is different than the obtaining method, to the electronic device;

identify, after the printer setting information is received, the electronic device by obtaining the identification information from the electronic device by the obtaining method; and send a print command and the printable file data to the electronic device AFP corresponding to the identification information, by the communication method, to cause the electronic device to print the printable file data based on the printer setting information.

2. The operation device as claimed in claim 1, wherein the processor is configured to:

obtain the identification information from the electronic device via wireless communication.

3. The operation device as claimed in claim 1, wherein:

the identification information includes an IP address of the electronic device.

4. The operation device as claimed in claim 1, wherein:

the scan command includes the scanner setting information.

5. The operation device as claimed in claim 1, wherein the processor is configured to:

send the scan command without receiving user input corresponding to a key press, and send the print command without receiving user input corresponding to a key press.

6. The operation device as claimed in claim 5, wherein the processor is configured to:

send the scan command, without receiving any input after specifying the electronic device by the identification information, and send the print command, without receiving any input after specifying the electronic device by the identification information.

7. The operation device as claimed in claim 1, wherein:
the attribute information includes at least one of a file name, a file size, a last-modified time, a creation time, or a format of the printable file data.

8. The operation device as claimed in claim 1, wherein:
the print command includes the printer setting information.

9. The operation device as claimed in claim 1, wherein the processor is configured to:
receive the printable file data from the server;
send, to the electronic device specified by the identification information, the printable file data received from the server, and the print command to instruct the electronic device to output the printable file data.

10. The operation device as claimed in claim 1, wherein:
the data includes a list for the attribute information of the printable file data.

11. A method, comprising:
displaying a first screen (i) including a button to receive scanner setting information, and (ii) indicating an obtaining method, the obtaining method for obtaining identification information for connecting an operation device, via a communication method which is different than the obtaining method, to an electronic device;
receiving the scanner setting information;
sending a scan command to the electronic device corresponding to the identification information to cause the electronic device to generate scanner data based on the scanner setting information and to send the scanner data;
receiving the scanner data sent from the electronic device;
receiving printer setting information;
identifying, after the printer setting information is received, the electronic device MFP by obtaining the identification information from the electronic device;
displaying data obtained from a server, the data including attribute information of printable file data;
receiving a selection of the attribute information which is within the data;
obtaining, from the server, the printable file data corresponding to the attribute information which was selected;
displaying a second screen (i) including a preview image of the printable file data, the preview image corresponding to an image contained within the printable file data, and (ii) indicating the obtaining method, the obtaining method for obtaining the identification information for connecting the operation device, via the communication method different than the obtaining method, to the electronic device;
identifying, after the printer setting information is received, the electronic device by obtaining the identification information from the electronic device by the obtaining method; and
sending a print command and the printable file data to the electronic device corresponding to the identification information, by the communication method, to cause the electronic device to print the printable file data based on the printer setting information.

12. The method as claimed in claim 11, wherein the attribute information includes at least one of:
a file name, a file size, a last-modified time, a creation time, or a format of the printable file data.

13. The method as claimed in claim 11, further comprising:
sending the scan command without receiving user input corresponding to a key press, and sending the print command without receiving user input corresponding to a key press.

14. The method as claimed in claim 13, further comprising:
sending the scan command, without receiving any input after specifying the electronic device by the identification information, and
sending the print command, without receiving any input after specifying the electronic device by the identification information.

15. The method as claimed in claim 11, wherein:
the data includes a list for the attribute information of the printable file data.

16. A system comprising:
an operation device; and
an electronic device,
wherein the operation device comprises,
a processor; and
a memory storing instructions, which when executed cause the processor to:
display a first screen (i) including a button to receive scanner setting information, and (ii) indicating an obtaining method, the obtaining method for obtaining identification information for connecting the operation device, via a communication method which is different than the obtaining method, to the electronic device;
receive the scanner setting information;
identify, after the scanner setting information is received, the electronic device by obtaining the identification information from the electronic device;
send a scan command to the electronic device corresponding to the identification information, to cause the electronic device to generate scanner data based on the scanner setting information and to send the scanner data to the operation device;
receive the scanner data sent from the electronic device;
receive printer setting information;
display data obtained from a server, the data including attribute information of printable file data;
receive, at the operation device, a selection of the attribute information which is within the data;
obtain, from the server, the printable file data corresponding to the attribute information which was selected;
display a second screen (i) including a preview image of the printable file data, the preview image corresponding to an image contained within the printable file data, and (ii) indicating the obtaining method, the obtaining method for obtaining the identification information for connecting the operation device, via the communication method different than the obtaining method, to the electronic device;
identify, after the printer setting information is received, the electronic device by obtaining the identification information from the electronic device by the obtaining method; and
send a print command and the printable file data to the electronic device corresponding to the identification information, by the communication method, to cause the electronic device to print the printable file data based on the printer setting information.

17. The system as claimed in claim 16, wherein:
the attribute information includes at least one of a file name, a file size, a last-modified time, a electronic device time, or a format of the printable file data.

18. The system as claimed in claim 16, wherein the processor is configured to:

send the scan command without receiving user input corresponding to a key press, and send the print command without receiving user input corresponding to a key press.

19. The system as claimed in claim 18, wherein the processor is configured to:

send the scan command, without receiving any input after specifying the electronic device by the identification information, and send the print command, without receiving any input after specifying the electronic device by the identification information.

20. The system as claimed in claim 16, wherein:

the data includes a list for the attribute information of the printable file data.

\* \* \* \* \*